United States Patent
Lin et al.

(10) Patent No.: US 11,295,438 B2
(45) Date of Patent: Apr. 5, 2022

(54) METHOD AND SYSTEM FOR MIXED MODE WAFER INSPECTION

(71) Applicant: KLA-Tencor Corporation, Milpitas, CA (US)

(72) Inventors: Jason Z. Lin, Saratoga, CA (US); Allen Park, San Jose, CA (US); Ellis Chang, Saratoga, CA (US); Richard Wallingford, San Jose, CA (US); Songnian Rong, San Jose, CA (US); Chetana Bhaskar, San Jose, CA (US)

(73) Assignee: KLA Corporation, Milpitas, CA (US)

( * ) Notice: Subject to any disclaimer, the term of this patent is extended or adjusted under 35 U.S.C. 154(b) by 113 days.

(21) Appl. No.: 16/206,691

(22) Filed: Nov. 30, 2018

(65) Prior Publication Data

US 2019/0108630 A1 Apr. 11, 2019

Related U.S. Application Data

(62) Division of application No. 14/076,350, filed on Nov. 11, 2013, now Pat. No. 10,192,303.

(60) Provisional application No. 61/725,265, filed on Nov. 12, 2012.

(51) Int. Cl.
*G06T 7/00* (2017.01)

(52) U.S. Cl.
CPC .... *G06T 7/001* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 7,061,625 | B1 | 6/2006 | Hwang et al. |
| 2005/0195396 | A1 | 9/2005 | Ono et al. |
| 2006/0193507 | A1 | 8/2006 | Sali et al. |
| 2008/0219545 | A1 | 9/2008 | Chen et al. |
| 2009/0323052 | A1 | 12/2009 | Silberstein et al. |
| 2011/0075151 | A1 | 3/2011 | Jeong |
| 2011/0164130 | A1 | 7/2011 | Chen |
| 2011/0296362 | A1 | 12/2011 | Ishikawa et al. |
| 2012/0163698 | A1 | 6/2012 | Michelsson |

FOREIGN PATENT DOCUMENTS

JP  07249393  9/1995

OTHER PUBLICATIONS

TW Office Action dated Feb. 12, 2018 for Taiwan Patent Application No. 102141126.

*Primary Examiner* — Vikkram Bali
(74) *Attorney, Agent, or Firm* — Suiter Swantz pc llo

(57) ABSTRACT

Mixed-mode includes receiving inspection results including one or more images of a selected region of the wafer, the one or more images include one or more wafer die including a set of repeating blocks, the set of repeating blocks a set of repeating cells. In addition, mixed-mode inspection includes adjusting a pixel size of the one or more images to map each cell, block and die to an integer number of pixels. Further, mixed-mode inspection includes comparing a first wafer die to a second wafer die to identify an occurrence of one or more defects in the first or second wafer die, comparing a first block to a second block to identify an occurrence of one or more defects in the first or second blocks and comparing a first cell to a second cell to identify an occurrence of one or more defects in the first or second cells.

9 Claims, 15 Drawing Sheets

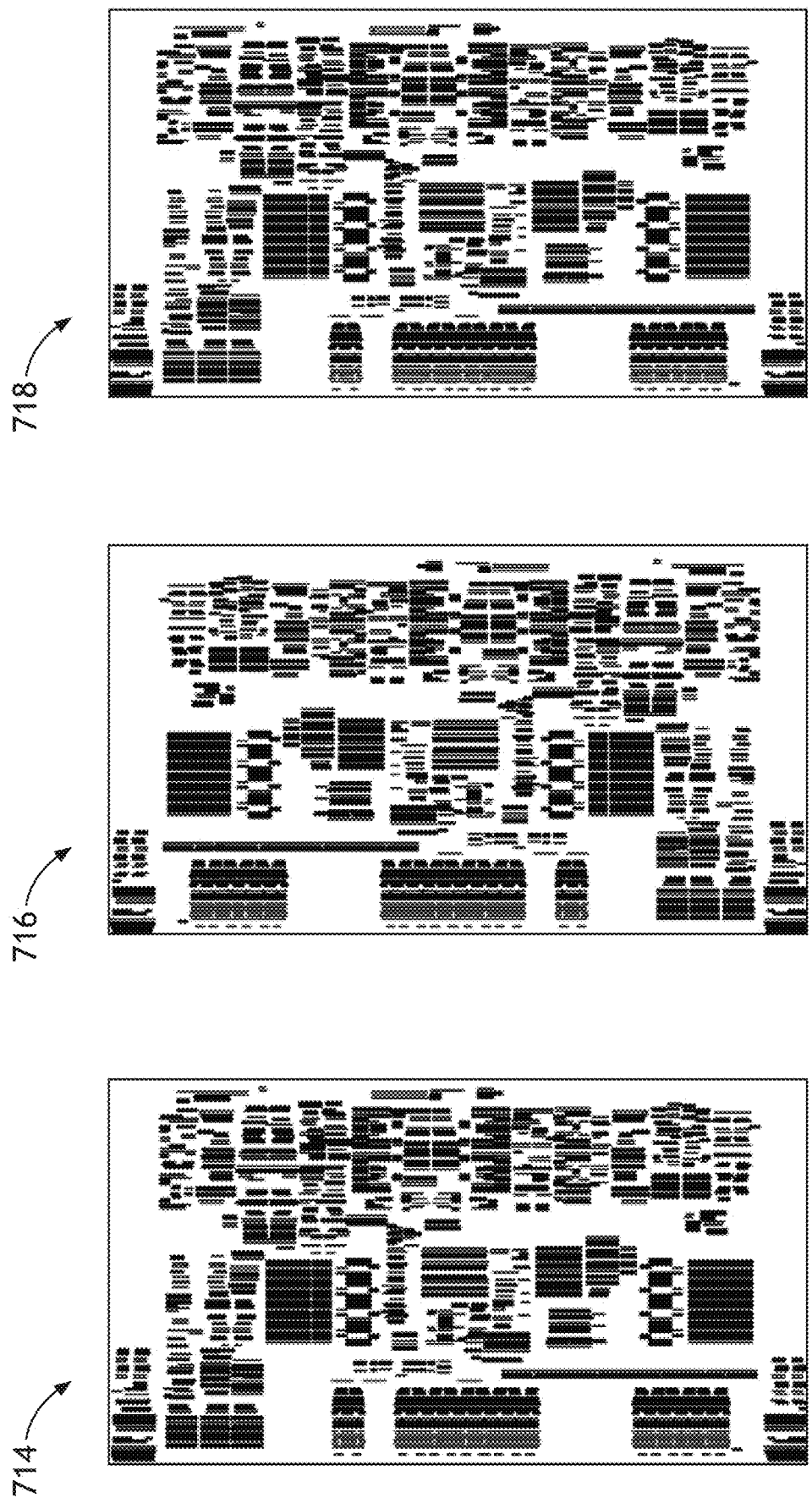

METHOD AND SYSTEM FOR MIXED MODE WAFER INSPECTION

CROSS-REFERENCE TO RELATED APPLICATION

The present application is related to and claims benefit of the earliest available effective filing date from the following applications. The present application constitutes a divisional patent application of U.S. patent application entitled METHOD AND SYSTEM FOR MIXED MODE WAFER INSPECTION, naming Jason Z. Lin, Allen Park, Ellis Chang, Richard Wallingford, Songnian Rong, and Chetana Bhaskar as inventors, filed Nov. 11, 2013, application Ser. No. 14/076,350, which is a regular (non-provisional) patent application of U.S. Provisional Patent Application entitled AWARE BLOCK-BLOCK COMPARISON MIXED WITH CELL-TO-CELL AND DIE-TO-DIE COMPARISONS FOR WAFER INSPECTION, naming Jason Lin, Allen Park, Ellis Chang, Dick Wallingford, Songnian Rong and Chetan Bhaska as inventors, filed Nov. 12, 2012, Application Ser. No. 61/725,265. U.S. patent application Ser. No. 14/076,350 and U.S. Provisional Patent Application No. 61/725,265 are incorporated by reference herein in their entirety.

TECHNICAL FIELD

The present invention generally relates to methods and systems for semiconductor wafer inspection.

BACKGROUND

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etching, deposition, and ion implantation. Multiple semiconductor devices may be fabricated in an arrangement on a single semiconductor wafer and then separated into individual semiconductor devices.

As used throughout the present disclosure, the term "wafer" generally refers to substrates formed of a semiconductor or non-semiconductor material. For example, a semiconductor or non-semiconductor material may include, but are not limited to, monocrystalline silicon, gallium arsenide, and indium phosphide. A wafer may include one or more layers. For example, such layers may include, but are not limited to, a resist, a dielectric material, a conductive material, and a semiconductive material. Many different types of such layers are known in the art, and the term wafer as used herein is intended to encompass a wafer on which all types of such layers may be formed. One or more layers formed on a wafer may be patterned or unpatterned. For example, a wafer may include a plurality of dies, each having repeatable patterned features. Formation and processing of such layers of material may ultimately result in completed devices. Many different types of devices may be formed on a wafer, and the term wafer as used herein is intended to encompass a wafer on which any type of device known in the art is being fabricated.

Inspection processes are used at various steps during a semiconductor manufacturing process to detect defects on a specimen such as a reticle and a wafer. Inspection processes have always been an important part of fabricating semiconductor devices such as integrated circuits. However, as the dimensions of semiconductor devices decrease, inspection processes become even more important to the successful manufacture of acceptable semiconductor devices. For instance, as the dimensions of semiconductor devices decrease, detection of defects of decreasing size has become necessary as even relatively small defects may cause unwanted aberrations in the semiconductor devices. As such, it would be advantageous to provide a system and method that provides improved wafer inspection capabilities.

SUMMARY

A method for providing mixed mode wafer inspection is disclosed. In one aspect, the method may include, but is not limited to, receiving one or more inspection results of a wafer, wherein the one or more inspection results include one or more images of a selected region of the wafer, the one or more images including one or more wafer die, the one or more wafer die including a set of repeating blocks, one or more of the set of repeating blocks, wherein the cells of each block are non-periodic or unresolvable; adjusting a pixel size of the one or more images in order to map each block to an integer number of pixels; adjusting a pixel size of the one or more images in order to map each die to an integer number of pixels; comparing a first wafer die to at least a second wafer die in order to identify an occurrence of one or more defects in at least one of the first wafer die and the at least a second wafer die; and comparing a first block to at least a second block in order to identify an occurrence of one or more defects in at least one of the first block and the at least a second block.

In another aspect, the method may include, but is not limited to, receiving one or more inspection results of a wafer, wherein the one or more inspection results include one or more images of a selected region of the wafer, the one or more images including one or more wafer die, the one or more wafer die including a set of repeating blocks, one or more of the set of repeating blocks including a set of repeating cells; adjusting a pixel size of the one or more images in order to map each cell to substantially an integer number of pixels; adjusting a pixel size of the one or more images in order to map each block to substantially an integer number of pixels; adjusting a pixel size of the one or more images in order to map each die to an integer number of pixels; comparing a first wafer die to at least a second wafer die in order to identify an occurrence of one or more defects in at least one of the first wafer die and the at least a second wafer die; comparing a first block to at least a second block in order to identify an occurrence of one or more defects in at least one of the first block and the at least a second block; and comparing a first cell to at least a second cell in order to identify an occurrence of one or more defects in at least one of the first cell and the at least a second cell.

In another aspect, the method may include, but is not limited to, receiving one or more inspection results of a wafer, wherein the one or more inspection results include one or more images of a selected region of the wafer, the one or more images including one or more wafer die, the one or more wafer die including a set of blocks, wherein at least some of the blocks are irregular, one or more of the set of the blocks including a set of repeating cells; adjusting a pixel size of the one or more images in order to map each cell to substantially an integer number of pixels; adjusting a pixel size of the one or more images in order to map each die to an integer number of pixels; aligning a first block with at least a second block; comparing a first wafer die to at least a second wafer die in order to identify an occurrence of one or more defects in at least one of the first wafer die and the at least a second wafer die; comparing a first block to at least a second block in order to identify an occurrence of one or more defects in at least one of the first block and the at least a second block; and comparing a first cell to at least a second cell in order to identify an occurrence of one or more defects in at least one of the first cell and the at least a second cell.

In another aspect, the method may include, but is not limited to, receiving one or more inspection results of a wafer, wherein the one or more inspection results include one or more images of a selected region of the wafer, the one or more images including one or more wafer die, the one or more wafer die including a set of blocks, one or more of the set of blocks include a set of repeating cells; adjusting a pixel size of the one or more images in order to map each cell to substantially an integer number of pixels; adjusting a pixel size of the one or more images in order to map each block to substantially an integer number of pixels; comparing a first block to at least a second block in order to identify an occurrence of one or more defects in at least one of the first block and the at least a second block; and comparing a first cell to at least a second cell in order to identify an occurrence of one or more defects in at least one of the first cell and the at least a second cell.

A method for providing field-to-field based wafer inspection is disclosed. In one aspect, the method may include, but is not limited to, receiving one or more inspection results of a wafer, wherein the one or more inspection results include one or more images of a selected region of the wafer, the one or more images including three or more fields, each of the three or more fields included in a common die; generating a reference field image by combining the three or more fields of the inspection results; and comparing one or more fields to the generated reference field image in order to identify an occurrence of one or more defects in the one or more fields.

A method for providing field-to-field based wafer inspection is disclosed. In one aspect, the method may include, but is not limited to, receiving one or more sets of design data at least associated with a region of interest of a wafer; identifying one or more repeating blocks in the received design data; selecting a portion of the identified one or more repeating blocks for inspection based on one or more selected attributes of the one or more repeating blocks; and performing one or more inspection processes with an inspection tool on the selected portion of the identified one or more repeating blocks.

A method for wafer inspection of fields of repeating pattern structures is disclosed. In one aspect, the method may include, but is not limited to, receiving one or more inspection results of a wafer including one or more images of a portion of a die of a wafer; presenting one or more portions of the received inspection results on a display; receiving a first signal indicative of a user identification of a first field of repeating pattern structures within the die of the presented one or more portions of the received inspection results; receiving at least a second signal indicative of a user identification of a second field of repeating pattern structures within the die of the presented one or more portions of the received inspection results, the at least a second field of repeating pattern structures differing from the first field of repeating pattern structure by one or more symmetry operations; and comparing corresponding portions of the first repeating pattern structure to the at least a second repeating pattern structure in order to identify an occurrence of one or more defects in at least one of the first field of repeating pattern structures and the at least a second repeating pattern structure.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 7B-7C illustrate a top view of an inspected wafer region including repeating cells not aligned on the horizontal axis, in accordance with one embodiment of the present invention.

DETAILED DESCRIPTION OF THE INVENTION

Reference will now be made in detail to the subject matter disclosed, which is illustrated in the accompanying drawings.

Referring generally to FIGS. 1A through 7F, a method and system for wafer inspection are described in accordance with the present disclosure.

The present invention is generally directed to block-to-block or field-to-field comparison in order to identify the presence of defects in an inspected wafer. The present invention is further directed to mixed-mode wafer inspection allowing for simultaneous comparison-based inspection of cells, blocks and die. In addition, the present invention is further directed to reference-based field-to-field inspection. Further, the present invention is directed to design data guided wafer inspection of blocks or fields of repeating cell structures.

In the case of memory wafers, cell-to-cell comparison may be utilized for the inspection of memory cell areas. It is further noted that page breaks or other peripheral areas may require die-to-die comparison to detect defects. As such, a mixed-mode inspection protocol including simultaneous cell-to-cell comparison (in the memory cell areas) and die-to-die comparison (in the page break and other peripheral areas) has been adopted to improve the throughput of memory wafer inspection. The sensitivity in the areas inspected by die-to-die comparison is usually inadequate as compared to the cell areas due to die-to-die process variation and other system related noise.

As more and more DRAM or SRAM memory and advanced circuit modules are integrated into a die on the wafer, each die or reticle typically includes many repeating blocks. As such, block-to-block comparison may allow for the reduction of process variation nuisances and increase defect detection sensitivity. Similarly, in a memory wafer, memory pages, blocks and/or sectors form repeating blocks. Further, page breaks and other peripheral areas may also be inspectable via block-to-block comparison leading to higher sensitivity.

Figure 1A:
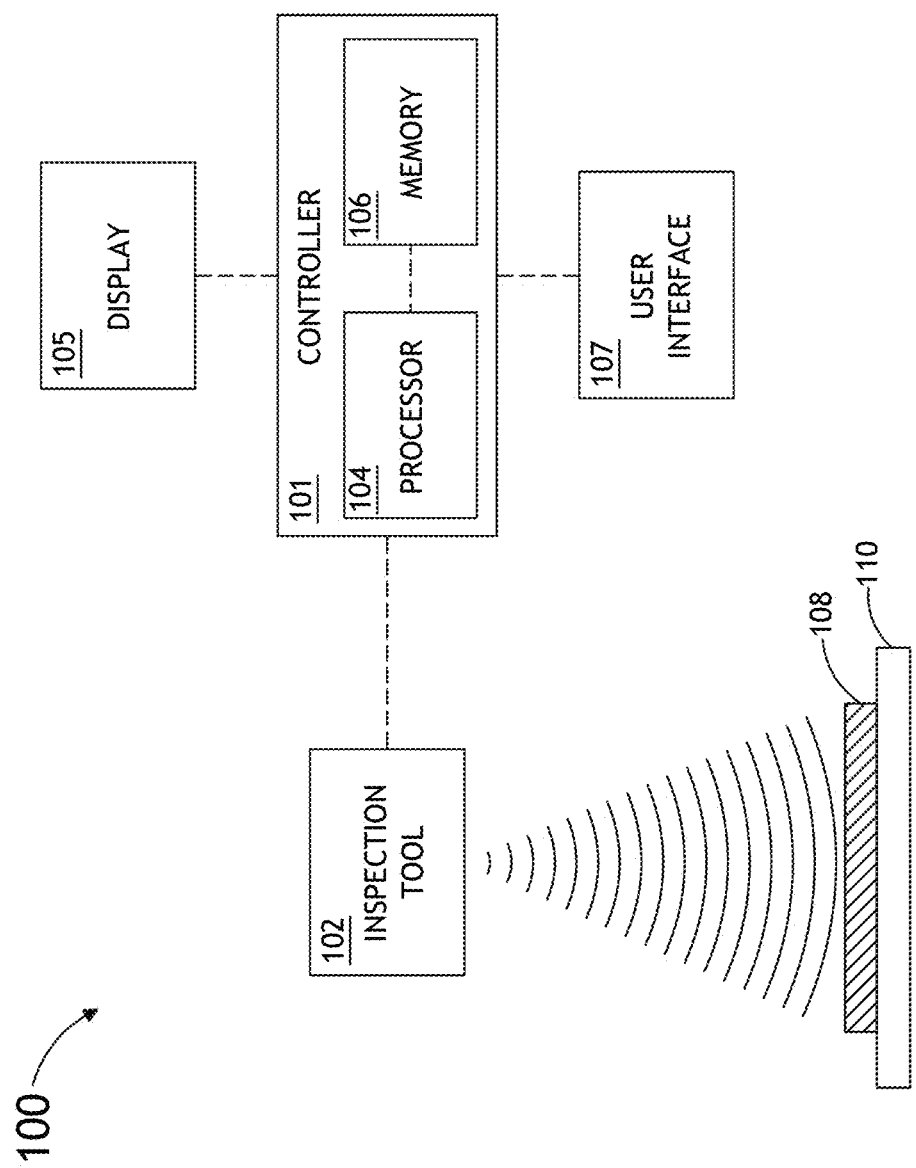
FIG. 1A is a block diagram view of a system for wafer inspection, in accordance with one embodiment of the present invention.

FIG. 1A illustrates a system 100 for wafer inspection suitable to perform the various processes described further herein. In one aspect, the system 100 may include an inspection tool 102 configured to detect defects on a semiconductor wafer 108 disposed on a sample stage 110. The inspection tool 102 may include any appropriate inspection tool or system known in the art, such as, but not limited to, an optical inspection tool or an electron beam inspection tool. For example, in the case of an optical inspection, the inspection tool 102 may include, but is not limited to, a bright-field inspection tool, or a dark-field inspection tool. In a further aspect, although not shown, the inspection tool 100 may include an illumination source, a detector and various optical components for performing inspection (e.g., lenses, beam splitters and the like).

The illumination source may include any illumination source known in the art. For example, the illumination source may include a narrow band light source, such as a laser source. In a further embodiment, the illumination source may be configured to direct light to surface of the wafer 108 (via various optical components) disposed on the sample stage 110. Further, the various optical components of the inspection tool 102 are configured to direct light reflected and/or scattered from the surface of an inspection region of the wafer 108 to the detector of the inspection tool 102.

The detector may include any appropriate detector known in the art. In one embodiment, the detector may include a charge coupled device (CCD) camera. The detector may be used to detect actual defects (e.g., defects) on wafer 108. In a further embodiment, the output of the detector may be communicatively coupled to the controller 101. In this regard, the controller 101 may be configured to detect actual defects on wafer 108 using detection data collected and transmitted by the detector. The controllers 101 may utilize any method and/or algorithm known in the art to detect defects on the wafer. Those skilled in the art should recognize that the inspection tool 102 may be utilized to detect defects distributed across the semiconductor wafer.

Further, the controller 101 may be coupled to the detector in any suitable manner (e.g., by one or more transmission media indicated by the dotted line shown in FIG. 1A) such that the controller 101 can receive the output generated by the detector. Furthermore, if the inspection tool 102 includes more than one detector (not shown), the controller 101 may be coupled to each detector as described above. In a further embodiment, the wafer 108 may be disposed on a sample stage 110. The sample stage 110 may include any appropriate mechanical and/or robotic assembly known in the art. Examples of currently available wafer inspection tools are described in detail in U.S. Pat. Nos. 7,092,082, 6,702,302, 6,621,570 and 5,805,278, which are each herein incorporated by reference in the entirety.

In a further embodiment, the inspection tool 102 may be configured to accept instructions from another subsystem of the system 100. For instance, the inspection tool 102 may accept instructions from the controller 101 (or analyzer) of system 100. Upon receiving the instructions from the controller 101, the inspection tool 102 may perform an inspection process at the locations of the semiconductor wafer 108 identified in the provided instructions (i.e., the inspection recipe). The controller 101 may further be configured to perform any other step(s) of any of the method embodiments described herein.

In another embodiment, the controller 101 of the system 100 may be configured to receive and/or acquire data or information from other systems (e.g., inspection results from an inspection system or metrology results from a metrology system) by a transmission medium that may include wireline and/or wireless portions. In this manner, the transmission medium may serve as a data link between the one or more controllers 101 and other subsystems of the system 100. Moreover, the one or more controllers 101 may send data to external systems via a transmission medium (e.g., network connection).

The one or more controllers 101 may include, but are not limited to, one or more processors 104. In another embodiment, the controller 101 of system 100 may include a non-transitory medium 106 (i.e., memory medium) in communication with the one or more processors 104. In another embodiment, the memory medium 106 includes program instructions for causing the one or more processors 104 to carry out the various steps described through the present disclosure.

The one or more processors 104 of controller 101 may include any one or more processing elements known in the art. In this sense, the one or more processors 104 may include any microprocessor-type device configured to execute software algorithms and/or instructions. In one embodiment, the one or more processors 104 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from a non-transitory memory medium 106. Moreover, different subsystems of the system 100 (e.g., display 105 or user interface 107 may include a processor or logic elements suitable for carrying out at least a portion of the steps described throughout the present disclosure. Therefore, the above description should not be interpreted as a limitation on the present invention but merely an illustration.

The memory medium 106 may include any storage medium known in the art suitable for storing program instructions executable by the associated one or more processors 104. For example, the memory medium 106 may include, but is not limited to, a read-only memory, a random access memory, a magnetic or optical memory device (e.g., disk), a magnetic tape, a solid state drive and the like. In another embodiment, it is noted herein that the memory 106 is configured to store one or more results from inspection tool 102 and/or the output of the various steps described herein. It is further noted that memory 106 may be housed in a common controller housing with the one or more processors 104. In an alternative embodiment, the memory 106 may be located remotely with respect to the physical location of the processors and controller 101. For instance, the one or more processors 104 of controller 101 may access a remote memory (e.g., server), accessible through a network (e.g., internet, intranet and the like).

In another embodiment, the wafer inspection system 100 may include a display 105. In another embodiment, the display 105 is communicatively coupled to the controller 101. For example, the display 105 may be communicatively coupled to one or more processors 104 of controller 101. In this regard, the one or more processors 104 may display one or more of the various results of the present invention on display 105.

The display device 105 may include any display device known in the art. In one embodiment, the display device 105 may include, but is not limited to, a liquid crystal display (LCD). In another embodiment, the display device 105 may include, but is not limited to, an organic light-emitting diode (OLED) based display. In another embodiment, the display device 105 may include, but is not limited to a CRT display. Those skilled in the art should recognize that a variety of display devices may be suitable for implementation in the present invention and the particular choice of display device may depend on a variety of factors, including, but not limited to, form factor, cost, and the like. In a general sense, any display device capable of integration with a user interface device (e.g., touchscreen, bezel mounted interface, keyboard, mouse, trackpad, and the like) is suitable for implementation in the present invention.

In another embodiment, the wafer inspection system 100 may include a user interface device 107. In one embodiment, the user interface device 107 is communicatively coupled to the one or more processors 104 of controller 101. In another embodiment, the user interface device 107 may be utilized by controller 101 to accept selections and/or instructions from a user. In some embodiments, described further herein, the display 105 may be used to display data to a user (not shown). In turn, a user may input selection and/or instructions (e.g., a user selection of inspection regions) responsive to inspection data displayed to the user via display device 105.

The user interface device 107 may include any user interface known in the art. For example, the user interface 107 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device or the like. In the case of a touchscreen interface device, those skilled in the art should recognize that a large number of touchscreen interface devices may be suitable for implementation in the present invention. For instance, the display device 105 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of the display device 105 is suitable for implementation in the present invention. In another embodiment, the user interface 107 may include, but is not limited to, a bezel mounted interface.

The embodiments of the system 100 illustrated in FIG. 1 may be further configured as described herein. In addition, the system 100 may be configured to perform any other step(s) of any of the method embodiment(s) described herein.

Figure 1B:
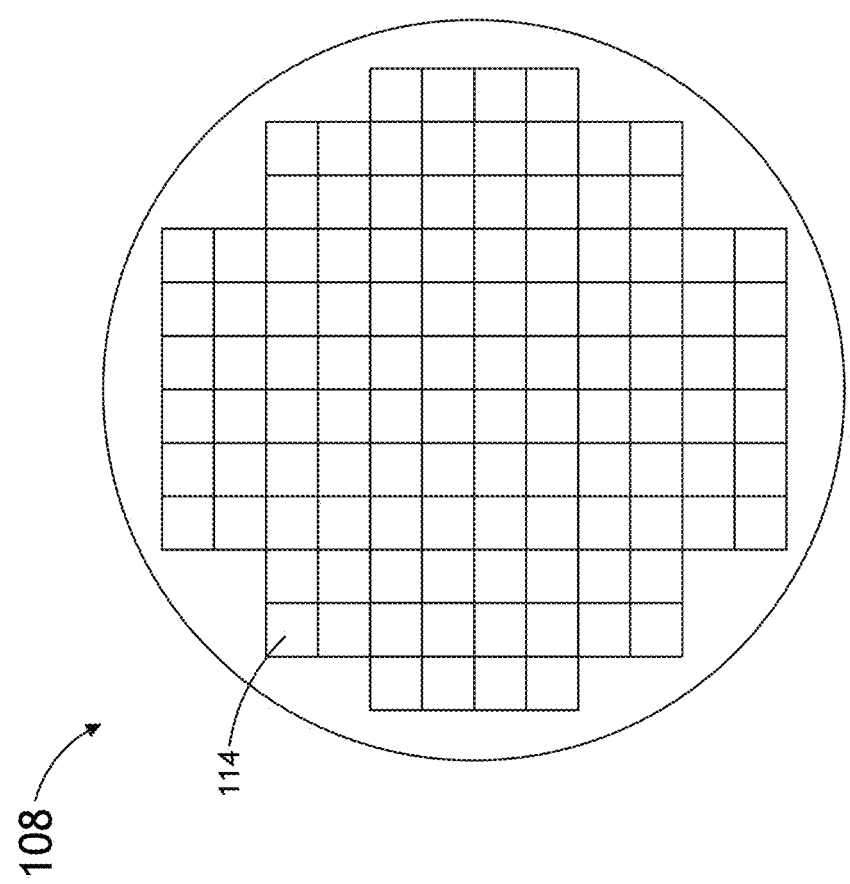
FIG. 1B is a top view of a wafer including a plurality of wafer dies, in accordance with one embodiment of the present invention.
Figure 1C:
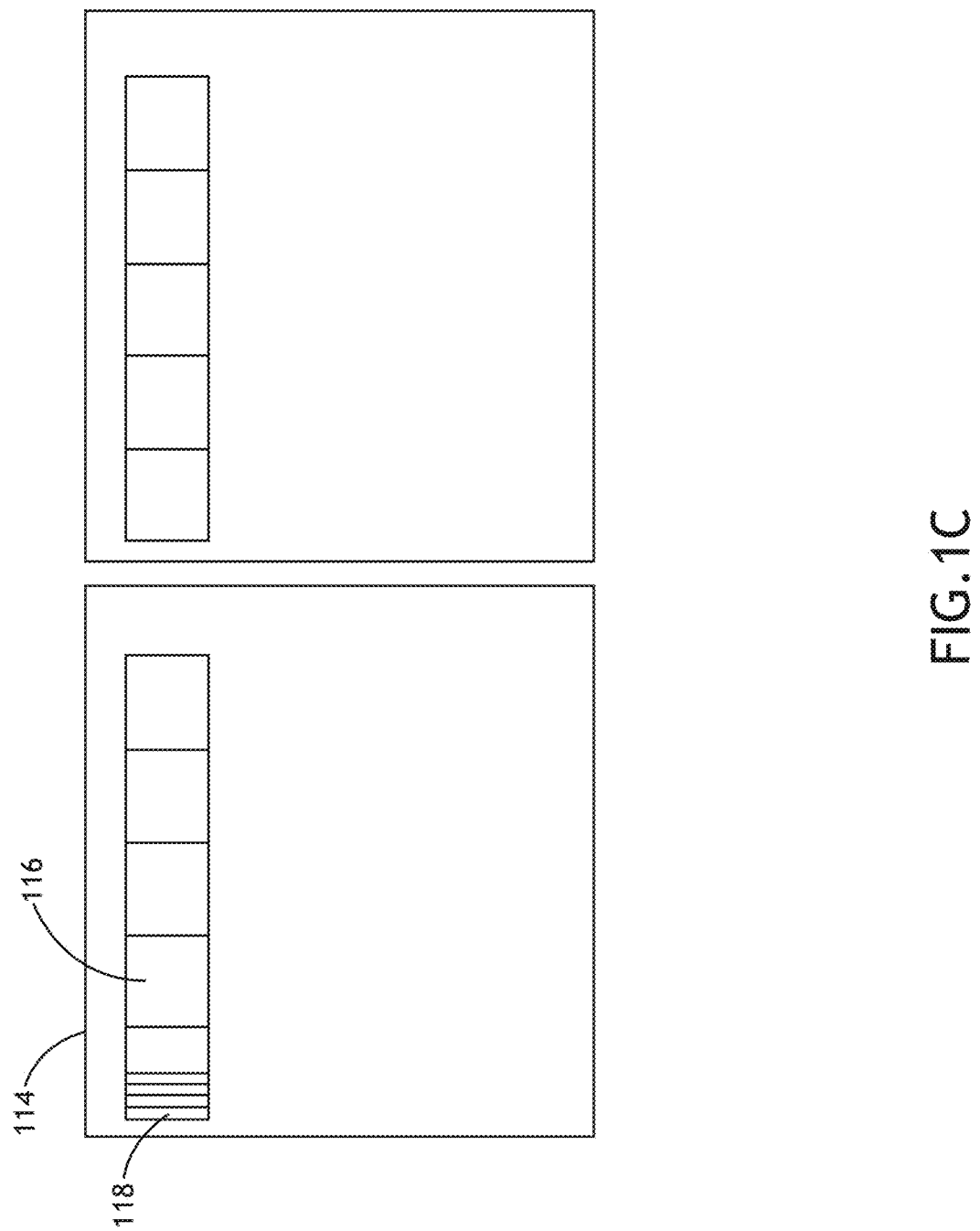
FIG. 1C is a top view of a die of a wafer including a set of repeating blocks with each block including a set of repeating cells, in accordance with one embodiment of the present invention.

FIGS. 1B and 1C illustrate the relationship between the wafer 108, the die 114 formed on the wafer 108, the blocks of cells 116 within each die, and the cells 118 within each block, in accordance with one embodiment of the present disclosure. It is noted that FIG. 1B depicts the scenario where a given die includes a set of repeating blocks of repeating cells. In contrast, FIG. 4B, discussed in more detail further herein depicts the scenario where a given die includes a set of irregular blocks, which may include irregularly positioned (among other things) blocks, which will be described in further detail herein.

In some embodiments, in mixed mode inspection including simultaneous cell-to-cell and die-to-die comparisons, the pixel size for acquiring wafer images is adjusted based on the cell and die size in order to minimize the alignment error for both cell-to-cell alignment and die-to-die alignment. In this regard, the pixel size is first selected and adjusted to form an inspection cell, which may consist of one or more physical cells, corresponding to an integer number of pixels. Such a configuration provides improved cell-to-cell comparison. Further, the pixel size may then be further adjusted (e.g., adjusted slightly), so that the die size also corresponds to an integer number of pixels.

The further adjustment of pixel size causes little disruption to the cell-to-cell comparison since the cell size only slightly deviates from an integer number of pixels since the amount of further adjustment is typically small. For example, in one non-limiting case, any non-integer die size D may need to be adjusted by at most ±0.5 pixels to make a non-integer die size D an integer number of pixels. In this case, the maximum ratio of change required in the pixel size for making the die an integer number of pixels is only 0.5/D. For example, a typical die size is approximately 5 mm, corresponding to 50,000 pixels each under 0.1 μm. As such, the ratio of deviation to the cell size is only 0.001%. Therefore, provided the variation in the total number of pixels in a cell is less than 0.01 pixels for a cell size of C pixels, the impact to the sensitivity of a cell-to-cell comparison should be generally negligible.

The following method embodiments relate to mixed mode comparison inspection involving cell-to-cell, block-to-block and die-to-die comparison for various cell, block and die settings. It is generally recognized that system 100 is suitable for implementing the inspection level and data processing level steps of the following embodiments. It is noted, however, the methods described below are not limited to the architecture of 100.

Figure 2:
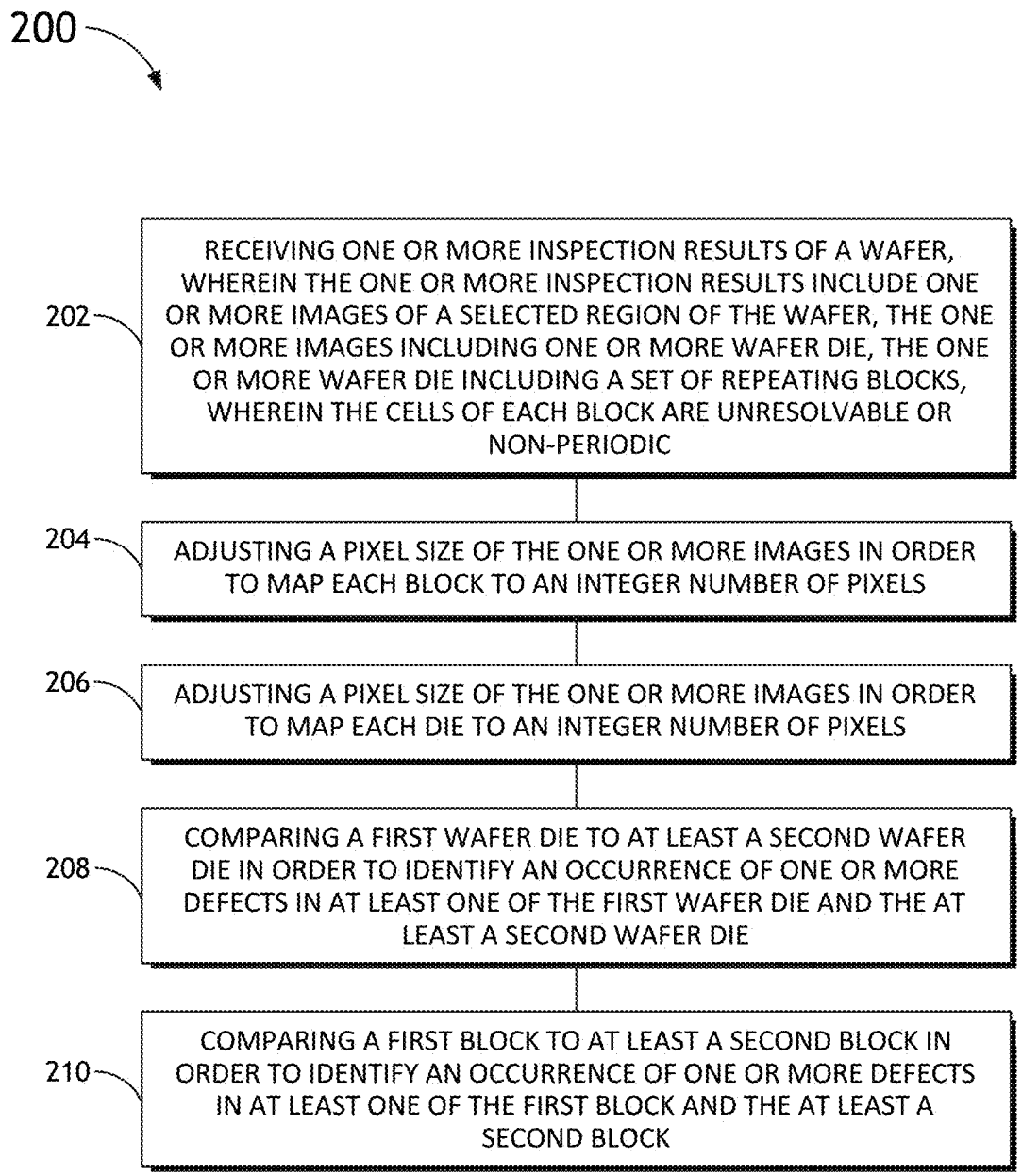
FIG. 2 is a flow diagram illustrating steps performed in a method for mixed-mode wafer inspection, in accordance with one embodiment of the present invention.

FIG. 2 is a flow diagram illustrating steps performed in a computer-implemented method 200 for mixed-mode wafer inspection, in accordance with one embodiment of the present invention. It is noted herein that a mixed-mode inspection process including a die-to-die and a block-to-block comparison technique may be accomplished by adjusting inspection pixels of system 100 in such manner that each block 116 and each die both correspond to an integer number of pixels. It is noted herein that the process 200 is generally applicable to settings where the cells of each inspected block 116 are not patterned. In this sense, the cells of the inspected blocks 116 may be unresolvable and/or non-periodic.

It is noted herein that the embodiments and examples described with respect to the various architectures and method of process 300, 400, 500, 600, 610 and 700 described throughout the present disclosure should be interpreted to extend to process 200 unless otherwise noted.

In a first step 202, inspection results of a wafer are received. For example, inspection imagery data may be received by controller 101 from inspection tool 102. By way of another example, inspection imagery data may be stored in memory 108. In this regard, the system 100 may store and then later access for analysis one or more sets of inspection imagery data. The inspection results received by the controller 101 may include any type of inspection data known in the art. For example, the inspection data may include, but is not limited to, bright field (BF) inspection data or dark field (DF) inspection data.

In one embodiment, the one or more inspection results include one or more images of a selected region of the wafer 108. In another embodiment, the one or more images received by the controller 101 include one or more wafer die (e.g., die 114). In a further embodiment, each wafer die of the received imagery data includes a set of repeating blocks (e.g., blocks 116). In another embodiment, the imagery data associated with each block of the set of blocks is non-patterned (e.g., cells are not periodic and/or are not resolvable).

In a second step 204, a pixel size of the one or more images is adjusted (or established and maintained) in order to map each block to an integer number of pixels. In a third step 206, a pixel size of the one or more images is adjusted (or established and maintained) in order to map each die to an integer number of pixels. In one embodiment, the pixel size may be selected. Then, after selection of the pixel size, the size of the pixels may be adjusted so that each block 116 includes, or corresponds to, an integer number of pixels. In turn, the size of the pixels may be further adjusted such that each die 114 includes, or corresponds to, an integer number of pixels. It is noted herein that in some cases the adjustment of pixel size may be rendered unnecessary. For example, based on trial and error and experience with the wafer patterns, the implementer (or the controller 101) may, in at least some instances, select an initial pixel size that matches the given feature (e.g., die, blocks or cells) to an integer number of pixels.

In a fourth step 208, a first wafer die is compared to at least a second wafer die in order to identify an occurrence of one or more defects in at least one of the first wafer die and the at least a second wafer die. In a fifth step 210, a first block is compared to at least a second block in order to identify an occurrence of one or more defects in at least one of the first block and the at least a second block. For example, following the pixel size adjustment of step 204, the pixel-adjusted imagery data of any of the blocks 116 may be compared to the pixel-adjusted imagery data of any of the other blocks. Similarly, following the pixel size adjustment of step 206, the pixel-adjusted imagery data of any wafer die 114 may be compared to the pixel-adjusted imagery data of any of the other wafer die.

It is noted herein that the comparison of steps 208 and/or 210 may be carried utilizing any image data comparison technique known in the art. In one embodiment, the comparison step 208 may include, but is not limited to, calculating a difference between the pixel values of the imagery associated with a first wafer die and the pixel values of the imagery data associated with at least a second wafer die. For example, the pixel values of the imagery associated with a first wafer die may be subtracted, pixel-by-pixel, from the pixel values of the imagery data associated with at least a second wafer die (or vice-versa). In this regard, the subtraction process may serve to remove, or at least aid in eliminating, periodic structures present in both sets of imagery data. In another embodiment, the comparison step 208 may include, but is not limited to, the application of a statistical aggregation process. For example, prior to calculating a difference between a imagery data of a first wafer die and the imagery data of at least a second wafer die, a pixel averaging procedure may be implemented, whereby adjacent pixel values of the wafer die imagery data are averaged prior to the difference calculation. It is noted herein that any differential comparison process known in the art may be used in the comparison step 208.

In one embodiment, two or more die 114 may be aligned with respect to one another prior to the comparison of step 208. In this regard, a first pattern feature of a first die 114 may be aligned with a second pattern of the at least one second die 114 prior to the execution of the comparison step 208. Similarly, in another embodiment, two or more blocks 116 may be aligned with respect to one another prior to the comparison of step 210. In this regard, a first pattern feature of a first block 116 may be aligned with a second pattern of the at least one second die 116 prior to the execution of the comparison step 210. In this embodiment, for example, the mixed mode inspection for simultaneous die-to-die and block-to-block comparisons may be carried out by having both die-to-die and block-to-block alignments performed during run time. The die-to-die alignment may include die-to-die alignment similar to that described previously herein for providing the offsets to the defect detection algorithm for performing digital interpolation. The block-to-block may also be used by the defect detection algorithm to digitally align the blocks before block-to-block comparison. Because the two alignments are essentially independent of each other, they may need to be aligned separately before defect detection algorithm can be applied.

It is noted, however, that in cases where one or more of the die 114 contains sufficiently large number of blocks 116, a die-to-die alignment may be necessary. Further, since the cells of the blocks 116 analyzed in process 200 do not include an array pattern and/or are not resolvable, a cell-to-cell comparison check is not required in process 200. It is noted, however, that various non-pattern inspection algorithms may be applied to improve the sensitivity to blocks 114 that contain non-resolvable array patterns.

Nevertheless, the deviation of the block size following pixel adjustment may become too large if the ratio between the block size and the die size becomes larger because a block is usually much larger than a cell. As discussed above, the adjustment of ±0.5 pixels with respect to a die size will lead to a 0.5 pixel change per die size (D) or 0.5/D. Further, the block size B will be changed proportionally with 0.5B/D. In order to ensure that this change is less than 0.01 pixels for adequate block-to-block comparison, the ratio B/D must be smaller than 0.02. By way of example, in the case of a 5 mm die, the block size cannot be greater than 0.1 mm or 1000 pixels (or under 0.1 µm pixel size). If the die size is larger then a larger block size may be acceptable provided there are at least 50 blocks (i.e., D/B≥1/0.02=50 blocks) in the die, assuming that positional accuracy is not a factor.

It is further noted that inaccuracy caused by stage vibration, air wiggle or other unknown random noise may contribute to additional deviation in the block size. The practical block size that can be accepted for block-to-block comparison (without doing alignment and/or interpolation) may be further limited. As pointed out above, an actual stage accuracy measurement may be needed to quantify the acceptable block size for operation without run-time block-to-block alignment. For larger block sizes, it may become inevitable that block-to-block alignment has to be performed to ensure proper sub-pixel alignment in block-to-block comparison.

Figure 3:
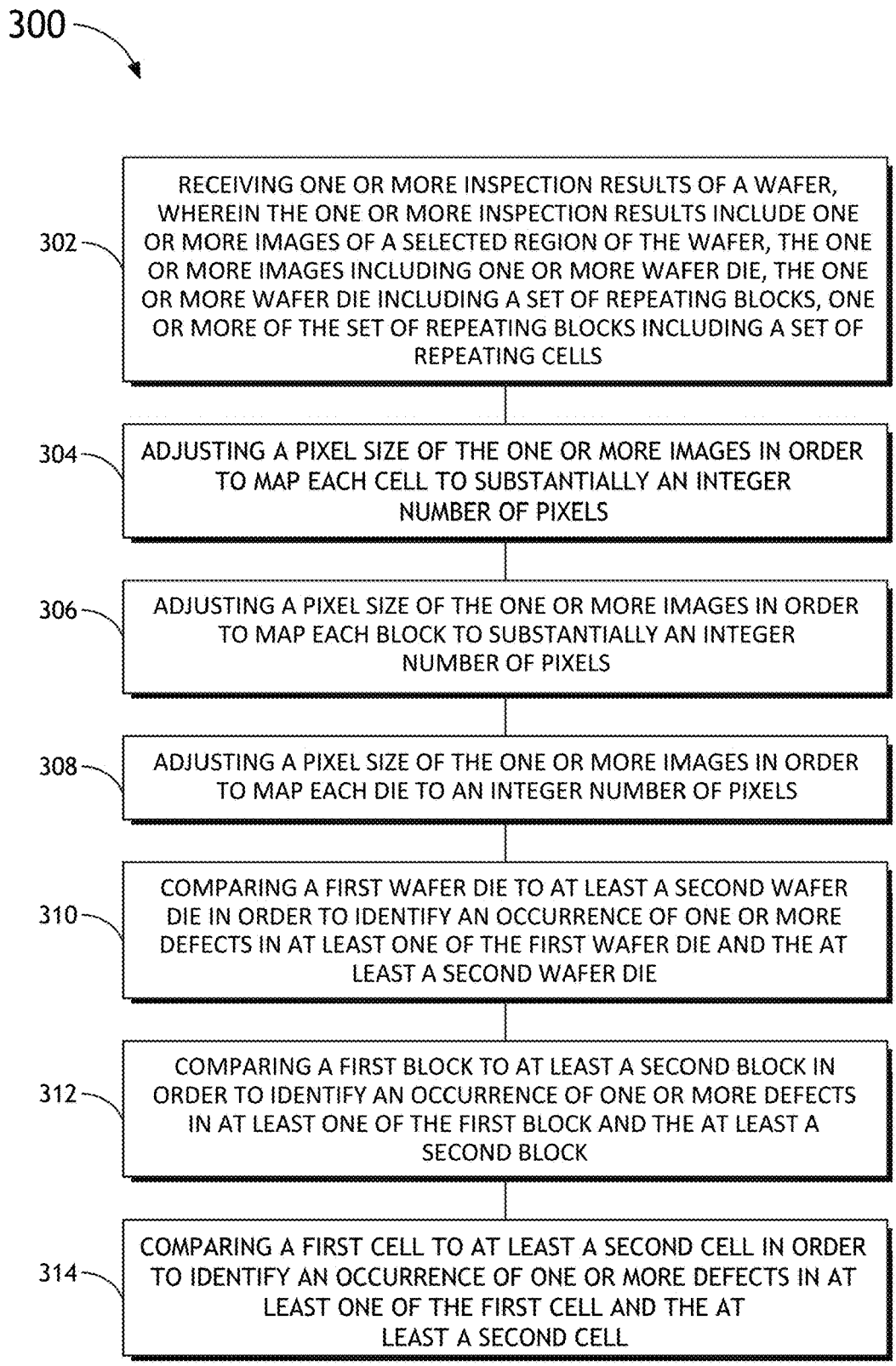
FIG. 3 is a flow diagram illustrating steps performed in a method for mixed-mode wafer inspection, in accordance with one embodiment of the present invention.

FIG. 3 is a flow diagram illustrating steps performed in a computer-implemented method 300 for mixed-mode wafer inspection, in accordance with an alternative embodiment of the present invention. It is noted herein that a mixed-mode inspection and analysis process 300 includes a die-to-die, block-to-block and cell-to-cell comparison technique. This may be accomplished by adjusting inspection pixels of system 100 in such manner that each block 116, each die 114 and each cell 118 consist of an integer number of pixels. It is noted herein that the process 300 is generally applicable to settings where the cells of each inspected block 116 are resolvable and include repeating patterns.

It is noted herein that the embodiments and examples described with respect to the various architectures and methods of processes 200, 400, 500, 600, 610 and 700 described throughout the present disclosure should be interpreted to extend to process 300 unless otherwise noted.

In a first step 302, inspection results of a wafer are received. For example, as previously described herein, inspection imagery data may be received by controller 101 from inspection tool 102 or retrieved from memory 108. Again, the inspection results received by the controller 101 may include any type of inspection data known in the art, such as, but not limited to, BF inspection data or DF inspection data.

In one embodiment, the one or more inspection results received in method step 302 include one or more images of a selected region of the wafer 108. In another embodiment, the one or more images received by the controller 101 include one or more wafer die (e.g., die 114). In a further embodiment, each wafer die of the received imagery data includes a set of repeating blocks (e.g., blocks 116). In another embodiment, the imagery data associated with each block of the set of blocks include one or more resolvable pattern or patterns of cells (e.g., resolvable array areas).

In a second step 304, a pixel size of the one or more images is adjusted in order to map each cell to substantially an integer number of pixels. In a third step 306, the pixel size of the one or more images is adjusted in order to map each block to substantially an integer number of pixels. In a fourth step 308, a pixel size of the one or more images is adjusted in order to map each die to an integer number of pixels. It is noted herein that the pixel selection and adjustment procedure (or establishing and maintaining) described with respect to process 200 should be interpreted as being extendable to the pixel selection and adjustment procedure of process 300.

In a fifth step 310, a first wafer die is compared to at least a second wafer die in order to identify an occurrence of one or more defects in at least one of the first wafer die and the at least a second wafer die. In a sixth step 312, a first block to at least a second block in order to identify an occurrence of one or more defects in at least one of the first block and the at least a second block. In a seventh step 314, a first cell is compared to at least a second cell in order to identify an occurrence of one or more defects in at least one of the first cell and the at least a second cell. It is noted herein that the comparison steps of process 200 described with respect to process 200 should be interpreted as being extendable to the comparison steps of process 300. It is further noted that the cell-to-cell comparison of step 312 may be carried out in any manner analogous to the die and block comparison steps described previously herein. It is further recognized that the comparison steps 310-314 may be performed simultaneously.

In one embodiment, as described previously, two or more die 114 may be aligned with respect to one another prior to the comparison of step 310. Similarly, in another embodiment, two or more blocks 116 may be aligned with respect to one another prior to the comparison of step 312.

In another embodiment, two or more cells 118 may be aligned with respect to one another prior to the comparison of step 314. It is noted herein that in settings where each die contains a sufficiently large number of blocks only die-to-die alignment may be necessary prior to the three-level mixed mode comparison of process 300 is carried out.

As noted previously herein, in some embodiments, the mixed mode inspection process may require the presence of approximately 50 or more blocks in a die in order to effectively carry out the mixed mode block-to-block comparison and die-to-die comparison without the use of run-time block alignment. Likewise, in settings where each block has more than 50 cells, in some embodiments, the pixel size adjustment may have a small or negligible impact on the sensitivity of the cell-to-cell comparison process (e.g., step 312). In one embodiment, in order to accomplish the cell-to-cell comparison process, the inspection pixel size may first be set up for achieving an integer number of pixels in a cell. Then, the pixel size may be tuned such that the given block includes an integer number of pixels. Finally, the adjusted pixel size is further tuned such that the given die includes an integer number of pixels. With proper adjustment in the pixel sizes, a three-mode inspection mixing cell-to-cell, block-to-block and die-to-die comparisons with only die-to-die alignment becomes possible.

For example, in the case where the die size is 50,000 pixels and the block size is 1000 pixels, it will be possible to perform a cell-to-cell, block-to-block and die-to-die mixed mode inspection process with only die-to-die alignment, providing the cell size is less than 20 pixels. Under these constraints, the inspection pixel size can be optically zoomed to make cell, block and die each correspond with an integer number of pixels.

Figure 4A:
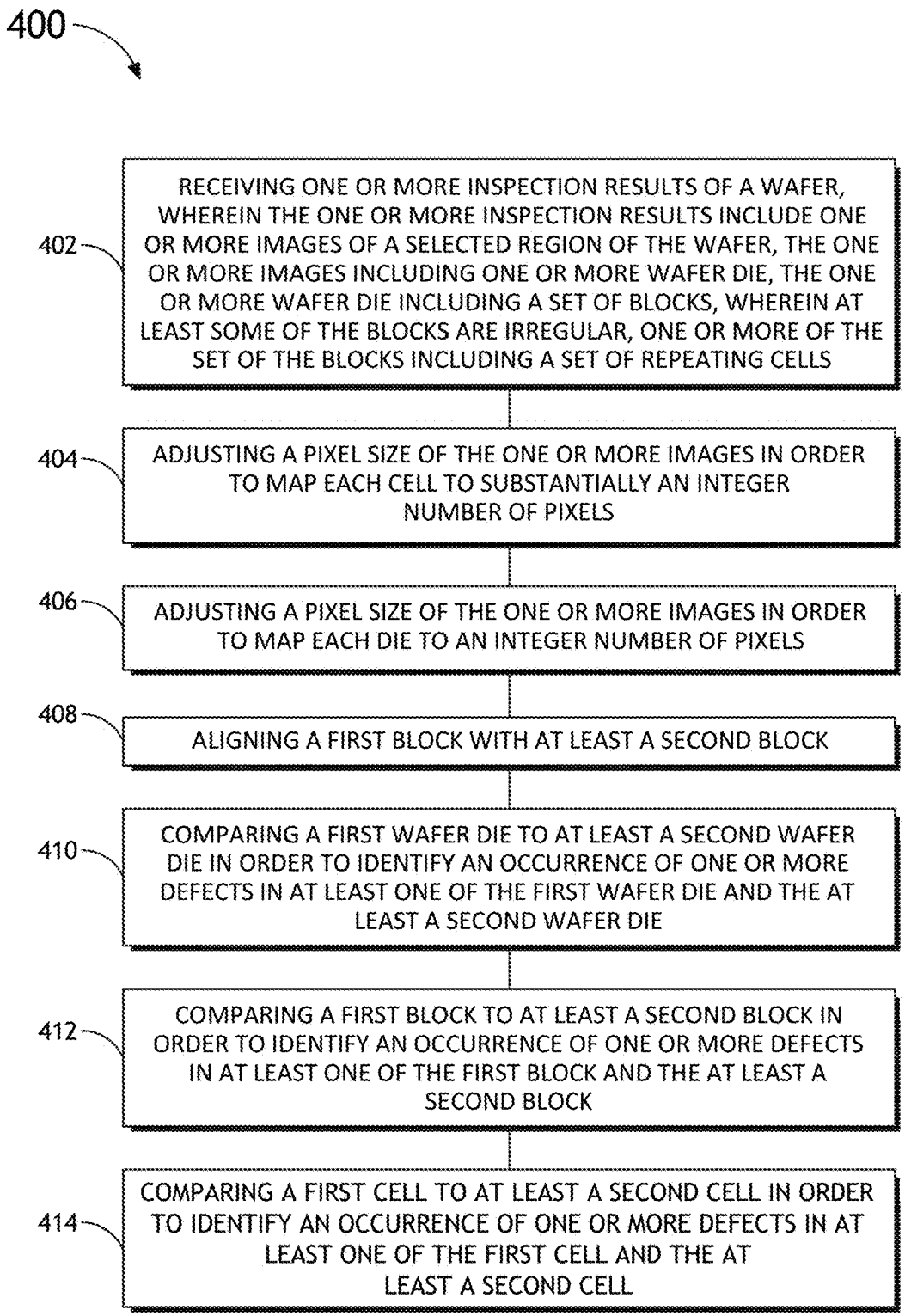
FIG. 4A is a flow diagram illustrating steps performed in a method for mixed-mode wafer inspection, in accordance with an alternative embodiment of the present invention.

FIG. 4A is a flow diagram illustrating steps performed in a computer-implemented method 400 for mixed-mode wafer inspection, in accordance with an alternative embodiment of the present invention. It is noted herein that a mixed-mode inspection and analysis process 400 includes a die-to-die, block-to-block and cell-to-cell comparison technique. This may again be accomplished by adjusting inspection pixels of system 100 in such manner that each block 116, each die 114 and each cell 118 consist of an integer number of pixels. It is noted herein that the process 400 is generally applicable to settings where blocks of the die are irregular (e.g., positioned irregularly, different types, different sizes and the like). It is further noted herein that the embodiments and examples described with respect to the various architectures and methods of processes 200, 300, 500, 600, 610 and 700 described throughout the present disclosure should be interpreted to extend to process 400 unless otherwise noted.

Figure 4B:
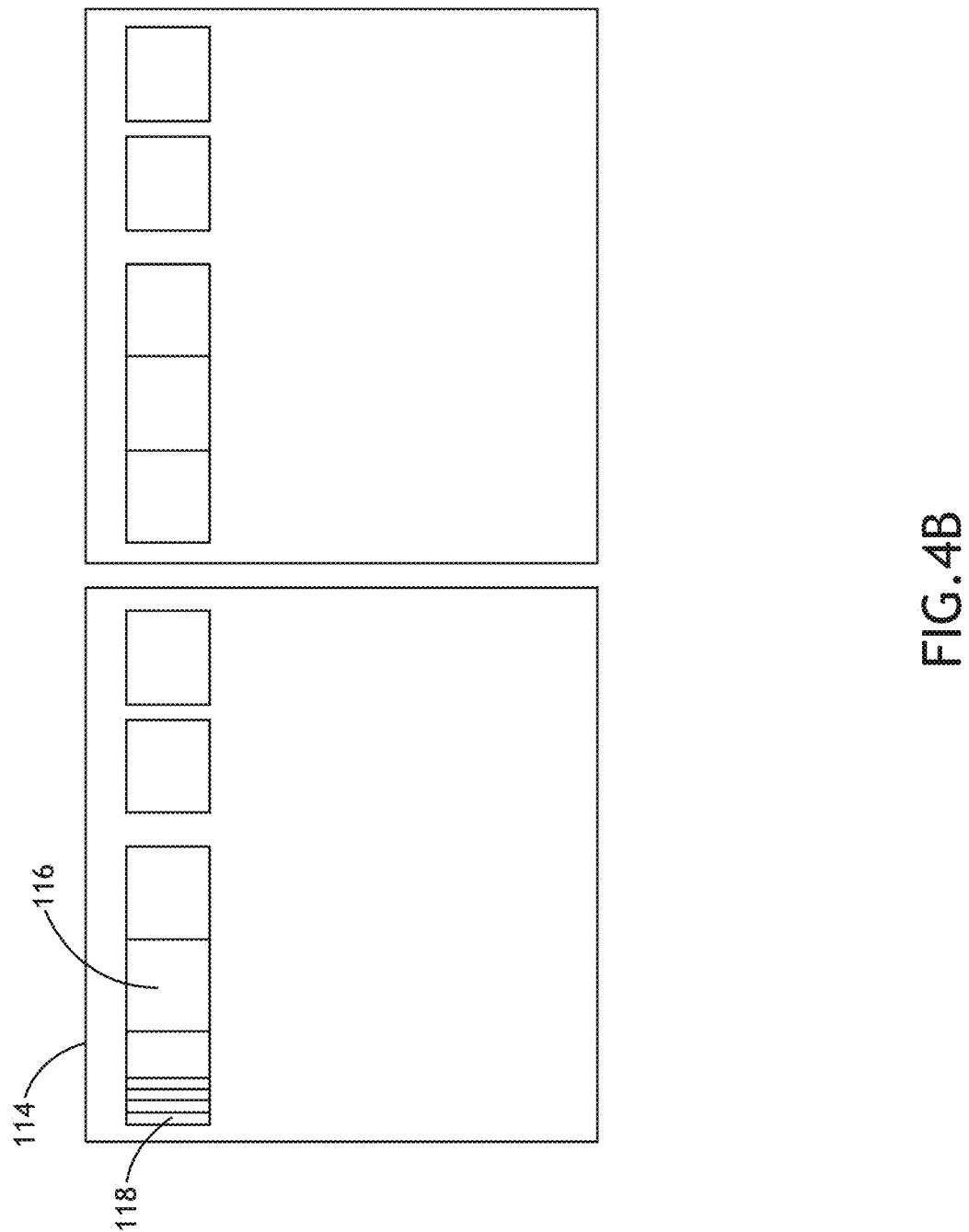
FIG. 4B is a top view of a die of a wafer including a set of irregular blocks with each block including a set of repeating cells, in accordance with one embodiment of the present invention.

It is noted herein that in more complicated circuit layouts, the blocks 116 of one or more die 114 may be positioned irregularly anywhere within the one or more die 114, as illustrated in FIG. 4B, wherein the edges of the blocks 116 are not aligned vertically or horizontally. It is further noted that the irregularity of the blocks analyzable using process 400 may result in any number of factors. For example, the blocks may be of different size or different type. Moreover, the blocks may be positioned randomly, in which case the edges of all the blocks fail to align along at least one axis. It is noted herein that block-to-block comparison optimization via an adjustable pixel technique is difficult in cases of the randomly positioned blocks.

It is further noted that in the case where blocks are aligned along a common vertical position, as shown FIG. 4B, the blocks may be positioned irregularly along the horizontal axis. In this example, it would be difficult to perform a block-to-block comparison for the purposes of inspecting the irregularly positioned blocks without first aligning the blocks. As such, a run-time block alignment may be implemented in order to carry out the block-to-block comparison.

In step 402, inspection results of a wafer are received. For example, as previously described herein, inspection imagery data may be received by controller 101 from inspection tool 102 or retrieved from memory 108. Again, the inspection results received by the controller 101 may include any type of inspection data known in the art, such as, but not limited to, BF inspection data or DF inspection data.

In one embodiment, the one or more inspection results received in method step 402 include one or more images of a selected region of the wafer 108. In another embodiment, the one or more images received by the controller 101 include one or more wafer die (e.g., die 114). In a further embodiment, each wafer die of the received imagery data includes a set of irregular blocks (e.g., different sized blocks, randomly positioned blocks, different types of blocks and the like).

In a second step 404, a pixel size of the one or more images is adjusted in order to map each cell to substantially an integer number of pixels. In a third step 406, a pixel size of the one or more images is adjusted in order to map each die to an integer number of pixels. It is noted herein that the pixel selection and adjustment procedure (or establishing and maintaining) described with respect to processes 200 and 300 should be interpreted as being extendable to the pixel selection and adjustment procedure of process 400.

In a fourth step 408, a first block is aligned with at least a second block. In one embodiment, two or more blocks 116 (e.g., irregular blocks of FIG. 4B) may be aligned with respect to one another prior to comparison. In this regard, a first pattern feature of a first block may be aligned with a second pattern of the at least a second block prior to the execution of the comparison step. In one embodiment, the alignment process of two or more blocks 116 includes a run-time alignment process. It is noted herein that the procedures utilized for die-to-die run-time alignment may be extended to the case of block-to-block alignment. In this regard, the blocks 116 may be treated as small die, with run-time alignment performed to align the blocks. It is further recognized that the block-to-block alignment may be implemented in software or via dedicated hardware.

In another embodiment, as described previously, two or more die 114 may be aligned (e.g., run-time alignment) with respect to one another prior to the comparison step of process 400. In another embodiment, two or more cells 118 may be aligned (e.g., run-time alignment) with respect to one another prior to the comparison of step 314.

In a fifth step 410, a first wafer die is compared to at least a second wafer die in order to identify an occurrence of one or more defects in at least one of the first wafer die and the at least a second wafer die. In a sixth step 412, following alignment, a first block is compared to at least a second block in order to identify an occurrence of one or more defects in at least one of the first block and the at least a second block. In a seventh step 414, a first cell is compared to at least a second cell in order to identify an occurrence of one or more defects in at least one of the first cell and the at least a second cell. It is noted herein that the comparison steps of process 200 and 300 described with respect to processes 200 and 300 should be interpreted as being extendable to the comparison steps of process 400. It is further recognized that the comparison steps 408-412 may be performed simultaneously.

Figure 5:
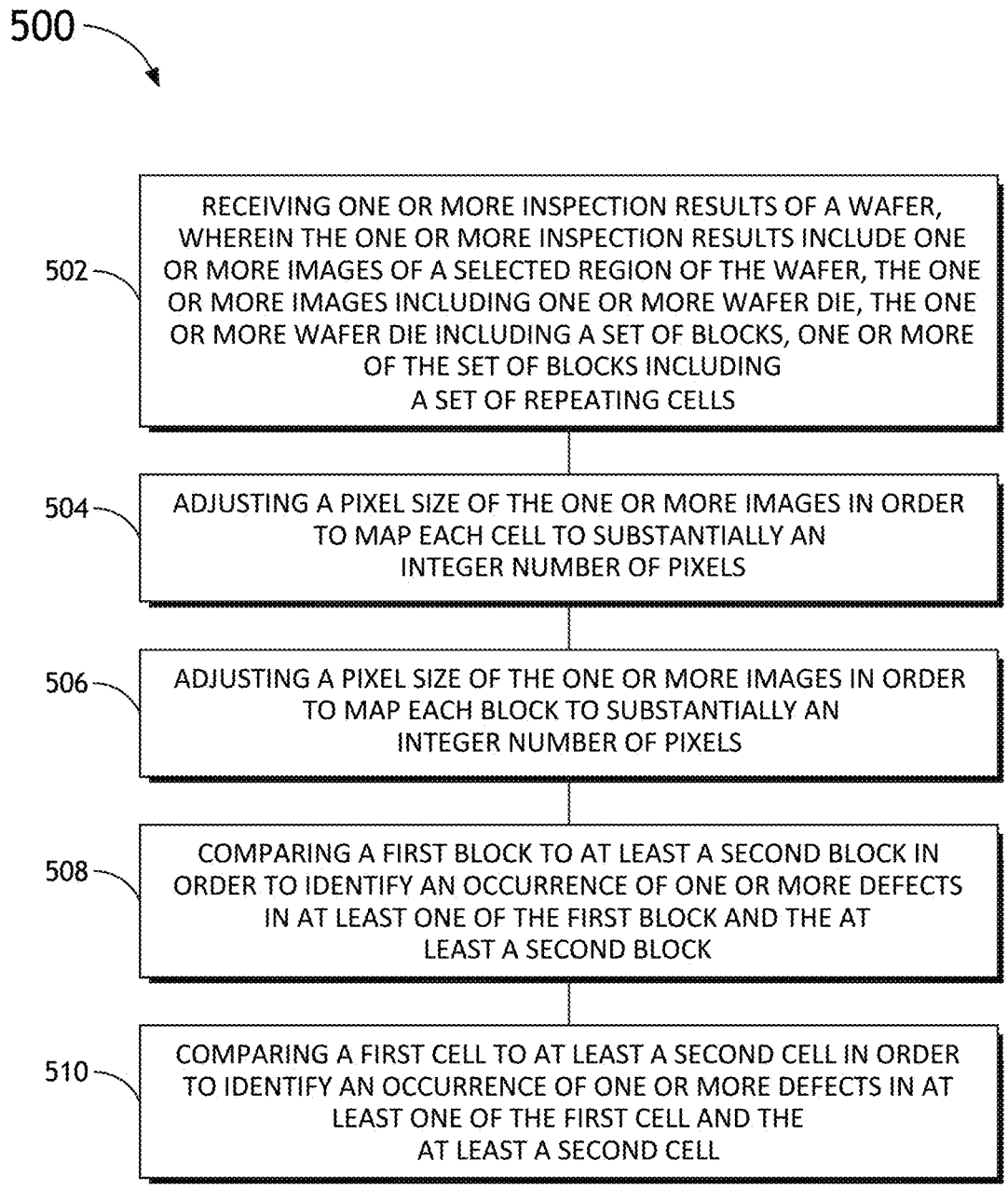
FIG. 5 is a flow diagram illustrating steps performed in a method for mixed-mode wafer inspection, in accordance with an alternative embodiment of the present invention.

FIG. 5 is a flow diagram illustrating steps performed in a computer-implemented method 500 for mixed-mode wafer inspection, in accordance with an alternative embodiment of the present invention. It is noted herein that a mixed-mode inspection and analysis process 500 includes a block-to-block and cell-to-cell comparison technique.

In some embodiments, a memory wafer may be inspected using cell-to-cell comparison, wherein page breaks and other peripheral areas are ignored. In this embodiment, block-to-block comparisons may be added for inspection of a wafer (e.g., memory wafer) without sacrificing the page breaks and other peripheral areas. The present embodiment may be carried out with or without block-to-block run-time alignment, as described previously herein. It is noted herein that the method 500 does not generally require die-to-die comparison. In this regard, the method 500 acts to provide cell-to-cell and block-to-block comparison in a manner similar to the cell-to-cell and die-to-die comparison described previously herein, with the block-to-block comparison of method 500 similar to the previously described die-to-die comparison.

The method 500 may be accomplished by adjusting inspection pixels of system 100 in such manner that each block 116 and each cell 118 consist of an integer number of pixels. It is noted herein that the process 500 is generally applicable to settings where cells (e.g., memory cells) form repeating blocks of cells on a wafer. It is further noted herein that the embodiments and examples described with respect to the various architectures and methods of processes 200, 300, 400, 600, 610 and 700 described throughout the present disclosure should be interpreted to extend to process 500 unless otherwise noted.

In first step 502, inspection results of a wafer are received. For example, as previously described herein, inspection imagery data may be received by controller 101 from inspection tool 102 or retrieved from memory 108. Again, the inspection results received by the controller 101 may include any type of inspection data known in the art, such as, but not limited to, optical inspection data (e.g., BF inspection data or DF inspection data) or electron beam inspection data.

In one embodiment, the one or more inspection results received in method step 502 include one or more images of a selected region of the wafer 108. In another embodiment, the one or more images received by the controller 101 include one or more blocks (e.g., memory blocks) of repeating cells. In one embodiment, the blocks may include repeating blocks, such as those described previously herein and depicted in FIG. 1C. In another embodiment, the blocks may include non-repeating or irregular blocks, such as those described previously herein and depicted in FIG. 4B.

In a second step 504, a pixel size of the one or more images is adjusted in order to map each cell 118 to substantially an integer number of pixels. In a third step 506, a pixel size of the one or more images is adjusted in order to map each block 116 to substantially an integer number of pixels. It is noted herein that the pixel selection and adjustment procedure (or establishing and maintaining) described with respect to processes 200-400 should be interpreted as being extendable to the pixel selection and adjustment procedure of process 500.

In a fourth step 508, a first wafer block is compared to at least a second wafer block in order to identify an occurrence of one or more defects in at least one of the first block and the at least a second block. In a fifth step 510, a first cell of a given block is compared to at least a second cell of the given block in order to identify an occurrence of one or more defects in at least one of the first cell and the at least a second cell. It is noted herein that the comparison steps of process 200-400 described previously herein should be interpreted as being extendable to the comparison steps of process 500. It is further recognized that the comparison steps 508 and 508 may be performed simultaneously.

In another embodiment, in settings where the block types are non-repeating (e.g., blocks of different size), each block type may need to undergo alignment (e.g., run-time alignment) prior to comparison step 508, as described previously herein. In another embodiment, in settings where the block types are repeating blocks, the blocks may not require an alignment process prior to comparison. For example, in settings where the memory cells created on a wafer form regularly repeating blocks on the wafer, an alignment process may not be required.

Figure 6A:
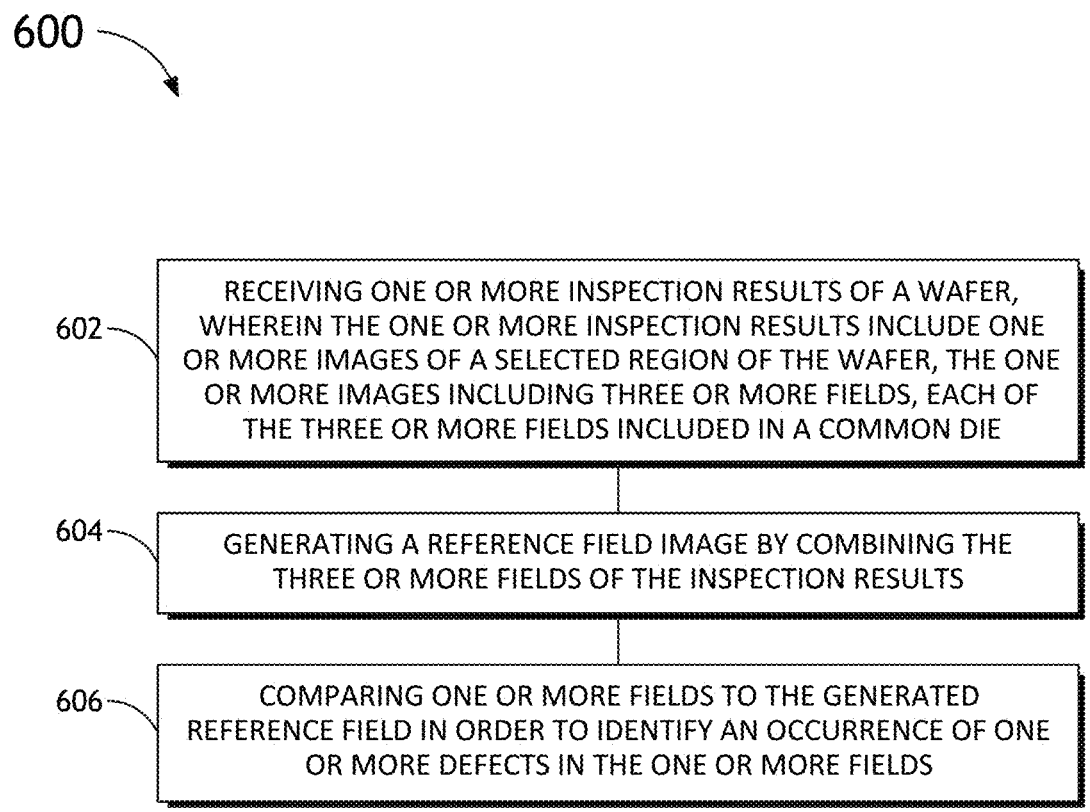
FIG. 6A is a flow diagram illustrating steps performed in a method for field-to-field based inspection of a wafer, in accordance with one embodiment of the present invention.

FIG. 6A is a flow diagram illustrating steps performed in a computer-implemented method 600 for field-to-field based inspection of a wafer, in accordance with one embodiment of the present invention. It is further noted herein that the embodiments and examples described with respect to the various architectures and methods of processes 200-500, 610 and 700 described throughout the present disclosure should be interpreted to extend to process 600 unless otherwise noted.

For the purposes of the present disclosure the term "field" is interpreted to include any repeating pattern structure within a die that can be aligned to one another and then compared to each other for defect detection. It is noted herein that the fields of a given die are not required to be equally spaced in either the x- or y-direction.

It is noted herein that the method 600 and associated systems are generally directed to settings where three or more repeating fields are to be inspected. In die-to-die inspection across three or more die, multiple images of the die are generally not combined to form a single reference image. This is because the images of the die are generally spaced at such large distances that any combined die image would be subject to distortion and wafer-scale process variation over the multiple die distance (without further remedies such as those described previously herein). As such, a lower noise is generally not achievable in a composite reference die image compared to the noise level of the individual constituent images. As such, the noise floor of a composite die image is usually equal to, or worse than, an individual neighboring reference die image.

In contrast, in field-to-field inspection, multiple field images may be combined to form a single reference image. A single composite reference image will generally possess a lower noise floor than that achievable in composite die images because the field images are in much closer proximity to one another. As such, they are not subject to as severe distortion and process variation differences as die-to-die images. In general, method 600 provides (i) a lower noise floor than any individual field image; and (ii) robust elimination of any defects in the "single reference field" induced by the component individual reference fields.

In a first step 602, one or more inspection results of a wafer are received. For example, as previously described herein, inspection imagery data may be received by controller 101 from inspection tool 102 or retrieved from memory 108. Again, the inspection results received by the controller 101 may include any type of inspection data known in the art, such as, but not limited to, optical inspection data (e.g., BF inspection data or DF inspection data) or electron beam inspection data. In one embodiment, the one or more inspection results received in method step 602 include one or more images of a selected region of the wafer 108. In another embodiment, the one or more images include three or more fields, with each of the three or more fields included in a common die.

In a second step 604, a reference field image is generated by combining the three or more fields of the inspection results. For example, one, two, or three fields of the inspection results may be combined into a single reference field image. In general, the reference field image may be formed from the combination of three through N field images of a common die.

In a third step 606, one or more fields are compared to the generated reference field in order to identify an occurrence of one or more defects in the one or more fields. In one embodiment, the generated reference field image may be compared to one or more field images acquired in the same inspection data acquisition as the acquisition used to generate the reference field image. In another embodiment, the generated reference field image may be compared to one or more field images acquired in an inspection data acquisition different from the acquisition used to generate the reference field image.

In one embodiment, the comparison step 606 may include, but is not limited to, calculating a difference between the pixel values of the imagery data associated with the reference field image and the pixel values of the imagery data associated with one or more other field images. For example, the pixel values of the imagery associated with a reference field image may be subtracted, pixel-by-pixel, from the pixel values of the imagery data associated with another (compared to) field image. In this regard, the subtraction process may serve to remove, or at least aid in eliminating, periodic structures present in both sets of imagery data. It is noted that any of the image processing techniques described throughout the present disclosure are applicable to method 600. It is further noted that any of the comparison techniques of method 600 are extendable to all of the various methods of the present disclosure.

It is noted that any comparison technique known in the art is suitable for implementation in the present invention. For example, the three or more fields of a given die may be combined utilizing any ensemble-based pixel processing procedure. For instance, the ensemble-based pixel processing procedure may include, but is not limited to, the following: (i) median processing; (ii) arithmetic averaging, (iii) geometric averaging, (iv) weighted averaging, (v) best linear unbiased estimation and (vi) any other statistical estimation technique for determining an optimal value, given N measurements.

In general, the comparison technique of the present invention may include, but is not limited to, an image subtraction process. For example, the pixel-by-pixel difference calculation procedure described previously herein may be utilized to calculate a difference between the reference field image and one or more field images in order to identify one or more defects. In a further embodiment, following an image subtraction process, a thresholding algorithm may be applied. For example, an image comparison technique is generally described in U.S. Pat. No. 7,440,607 to Lin, filed on Nov. 3, 2004, which is incorporated herein by reference in the entirety.

In another embodiment, prior to running a field-to-field inspection process, the geometrical and inspection parameters of the inspection are defined. In one embodiment, the geometrical parameters to be defined by the system 100 may include, but are not limited to, the number of fields, the height and width of each field, locations of each field (e.g., x-y positions) and any regions within a field to be excluded from inspection. In another embodiment, the geometrical parameters may be specified as follows. In one embodiment, one or more of the geometrical parameters may be manually incorporated into an inspection recipe through a user input (not shown). In this regard, a user may enter one or more geometrical parameters into system 100 based on prior knowledge (e.g., trial and error) of the field-to-field design layout. In another embodiment, one or more geometrical parameters may be incorporated into an inspection recipe through an interface to design layer, such as, but not limited to, GDS2CA. In another embodiment, the one or more geometrical parameters may be incorporated into an inspection recipe through the exploration of an image of a full-die macroview. It is further noted that one or more inspection parameters may be determined through any inspection parameter determination technique known in the art. In this regard, techniques used for determining best mode and detection thresholds in the context of die-to-die data may be extended to the context of the field-to-field data of the present invention. For example, optics mode selection is generally extendable to the context of field-to-field data and is generally described in U.S. Pat. No. 7,570,797 to Wang, filed on May 10, 2005, which is incorporated herein by reference in the entirety. By way of another example, one step tuning is generally extendable to the context of field-to-field data and is generally described in U.S. Pat. No. 8,000,922 to Chen, filed on May 29, 2008, which is incorporated herein by reference in the entirety. By way of further example, a sensitivity tuner is generally extendable to the context of field-to-field data and is described in U.S. Pat. No. 6,985,220 to Chen, filed on Aug. 20, 2003, which is incorporated herein by reference in the entirety.

In another embodiment, these parameters may be automatically validated prior to the running of an inspection scan in order to avoid, or at least reduce, errors and false defects, which may be caused by incorrect parameters.

In one embodiment, validation of the field-to-field geometry parameters may be accomplished as part of a setup by running a sample inspection on the defined fields, followed by error checking techniques. In another embodiment, the geometry parameters may be validated by die different than the setup die (e.g., edge die).

It is noted herein that it is desirable to provide a noise floor in a field-to-field difference image lower than that of a corresponding die-to-die difference image. By comparing the field-to-field and die-to-die difference images it is possible to: (i) validate that the field geometry is correct; and (ii) assess the degree of benefit for the field-to-field inspection. It is further noted that the degree of benefit may be expressed as a numerical score to in order to determine if field-to-field inspection should be enabled.

The field pattern and geometry validation and error checking may be accomplished by any technique known in the art. In some embodiments, the field pattern and geometry validation and error checking may be carried out utilizing at least one of the following techniques: (i) detection of blowups in the difference image at same location in different difference calculations; (ii) gross degradation in the variance of the field-to-field difference images as compared to die-to-die difference images; (iii) low cross-correlation score when aligning field images together; and (iv) checking for mirrored fields (which are then be inspected by mirroring the data into the field-to-field algorithm).

It is further noted herein that the embodiments of the method and system for field-to-field inspection describe herein are extendable to the all methods and systems described in this disclosure. For example, it is contemplated herein that the principles of field-to-field inspection may be applied in the context of the mixed mode inspection (e.g., method 200-500) described previously herein.

Figure 6B:
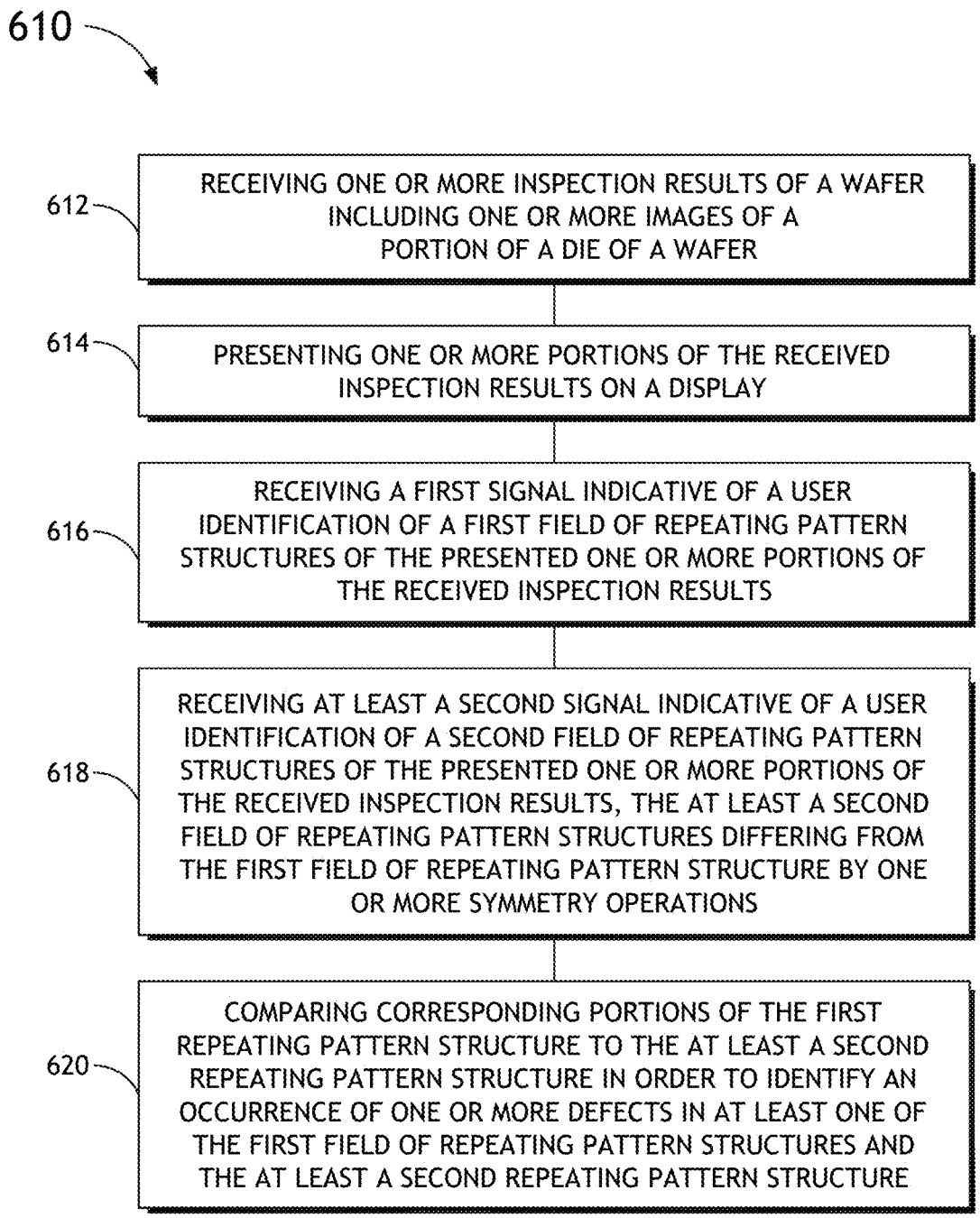
FIG. 6B is a flow diagram illustrating steps performed in a method for wafer inspection, in accordance with one embodiment of the present invention.

FIG. 6B is a flow diagram illustrating steps performed in a computer implemented method 610 for wafer inspection, in accordance with one embodiment of the present invention.

In a first step 612, one or more inspection results of a wafer including one or more images of a portion of a die of a wafer are received. For example, one or more inspection results of wafer 108 may be received by one or more processors 104 of controller 101 from inspection tool 102 (e.g., optical inspection tool or e-beam inspection tool). For instance, the inspection results may include imagery data associated with one or more die of the wafer 108 or one or more portions of a single die of the wafer 108. Further, the inspection results may include imagery data that includes one or more fields of repeating structures (e.g., field of repeating cells or polygons). In one embodiment, the fields of the inspection image may include regularly repeating fields (i.e., regularly spaced fields having same size and shape). In another embodiment, the fields within the inspection image may include irregular fields. For instance, the fields may be irregularly spaced (i.e., not evenly spaced along a first and/or second direction (x- or y-directions)). In another instance, the fields need not be aligned a common axis (e.g., x- or y-directions).

In a second step 614, one or more portions of the received inspection results are presented on a display. For example, upon receiving the inspection results of step 612, the inspection results (or a portion of the inspection results) may be digitally displayed to a user (not shown) on display 105. In this regard, the controller 101 may display a region of a die of a wafer 108 including one or more fields (e.g., regularly spaced fields or irregularly spaced fields).

In a third step 616, a first signal indicative of a user identification of a first field of repeating pattern structures within the die of the presented one or more portions of the received inspection results is received. In this regard, the controller 101 is configured to receive an instruction or indication from a user interface 107 as to a region of the displayed inspection results the user has identified as being a field pattern (i.e., containing a set of repeating cells or other structures). For example, a user may select a region of the displayed imagery data utilizing the user interface device (e.g., mouse, trackball, keyboard, digital pen, or integrated touchscreen).

In a fourth step 618, a second signal indicative of a user identification of a second field of repeating pattern structures within the die of the presented one or more portions of the received inspection results is received. In this regard, the second field of repeating pattern structures may differ from the first field of repeating pattern structures by one or more symmetry operations. For example, the symmetry operations may include a flipping operation and/or a rotation operation. For instance, the controller 101 may be configured to receive an instruction or indication from a user interface 107 as to a region of the displayed inspection results the user has identified as differing from the first field of repeating pattern structures by only a symmetry operation. For example, a user may mark or identify (using user interface 107) a region of the displayed inspection results believed to differ from the first field of repeating structures by only a symmetry operation. For instance, a user may mark or identify (using user interface 107) a region of the displayed inspection results believed to differ from the first field of repeating structures by only a flipping operation. In another instance, a user may mark or identify (using user interface 107) a region of the displayed inspection results believed to differ from the first field of repeating structures by only a rotation operation.

In a fifth step 620, corresponding portions of the first repeating pattern structure are compared to the at least a second repeating pattern structure in order to identify an occurrence of one or more defects in at least one of the first fields of repeating pattern structures and the at least a second repeating pattern structure. For example, the controller 101 may compare portions of the first field of repeating structures with matching portions of the flipped/rotated second field of repeating structures. In this regard, the controller 101 may effectively spatially match the first field of repeating structures with the second field of repeating structures prior to carrying out a pixel-by-pixel comparison between the two fields. It is further noted that any image comparison technique described in the present disclosure may be utilized to carry out the comparison.

It is noted that FIG. 7C, described in more detail further herein, depicts an example of fields differing by a flipping operation. For instance, image portion 714 depicts a first field image, while image portion 716 depicts a flipped version of portion 714, as appearing in acquired inspection data. Image 718 depicts a flip-adjusted view of field image 716, wherein the image 716 was flipped vertically to arrive at a substantial duplicate of field image 714. Following the flip adjustment, the controller 101 may then carry out a field-to-field comparison between the first field and the flip-adjusted field. It is further recognized that this process is readily extendable to the case of rotation or any other symmetry operation known in the art.

It is noted herein that the embodiments and examples described with respect to the various architectures and methods of processes 200, 300, 400, 500, 610 and 700 described throughout the present disclosure should be interpreted to extend to process 610 unless otherwise noted.

Figure 7A:
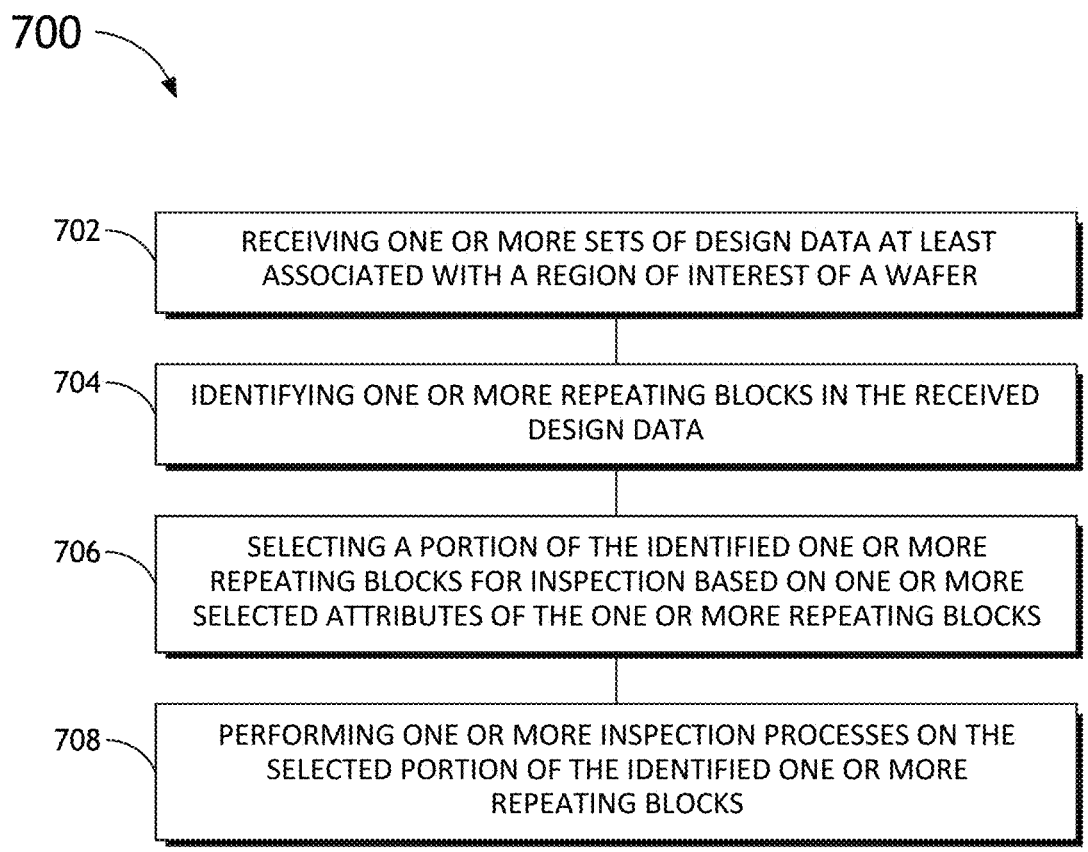
FIG. 7A is a flow diagram illustrating steps performed in a method for design data based inspection of repeating blocks, in accordance with one embodiment of the present invention.

FIG. 7A is a flow diagram illustrating steps performed in a computer implemented method 700 for design data based inspection of repeating blocks, in accordance with one embodiment of the present invention.

It is noted herein that a semiconductor chip design data may include what is known as a "floorplan," which contains placement information for repeating structures known as cells. It is further noted herein that this information may be extracted from the physical design of a chip usually stored in GDSII or OASIS file formats. The structural behavior or process-design interactions may be a function of the context (surroundings) of a cell. By using the floor plan, the analysis proposed can identify repeating blocks of structures, such as cells, polygons and the like. Further, the proposed method may provide the coordination information of these repeating blocks as well as the context (what are the adjacent structures) of the repeating blocks.

The term "design data" as used in the present disclosure generally refers to the physical design of an integrated circuit and data derived from the physical design through complex simulation or simple geometric and Boolean operations. In addition, an image of a reticle acquired by a reticle inspection system and/or derivatives thereof may be used as a proxy or proxies for the design data. Such a reticle image or a derivative thereof may serve as a substitute for the design layout in any embodiments described herein that uses design data. Design data and design data proxies are described in U.S. Pat. No. 7,676,007 by Kulkarni issued on Mar. 9, 2010; U.S. patent application Ser. No. 13/115,957 by Kulkarni filed on May 25, 2011; U.S. Pat. No. 8,041,103 by Kulkarni issued on Oct. 18, 2011; and U.S. Pat. No. 7,570,796 by Zafar et al. issued on Aug. 4, 2009, all of which are incorporated herein by reference. Further, the use of design data in directing inspection processes is described generally in U.S. patent application Ser. No. 13/399,805 to Park, filed on Feb. 17, 2012, which is incorporated herein by reference in the entirety.

In a first step 702, one or more sets of design data associated with a region of interest of a wafer are received. For example, the one or more processors 104 of controller 101 may receive a design layout file from a data source (e.g., memory 106 or remote source). In one embodiment, the region of interest may include, but is not limited to, one or more die of a wafer. In another embodiment, the inspection region of interest may include, but is not limited to, one or more blocks (e.g., blocks 116 of die 114) or fields of a die of a wafer. It is noted herein that the following description of method 700 will focus on the case of inspection of blocks of repeating structures, however it is recognized herein that method 700 is applicable to the case of fields, as defined previously herein, of repeating structures within a die.

In a second step 704, one or more repeating blocks are identified in the received design data. In a third step 706, a portion of the identified one or more repeating blocks are selected for inspection based on one or more selected attributes of the one or more repeating blocks. In a fourth step 708, one or more inspection processes are performed on the selected portion of the identified one or more repeating blocks.

In one embodiment, repeating blocks (e.g., repeating set of polygons or cells) may be identified using design data contained in a design layout file, such as OASIS or GDS. In another embodiment, each design layout is provided to the controller 101 (or the "analyzer") and analyzed based on a cell hierarchy in order to identify repeating cells or set of polygons. It is noted herein that the repeating blocks may vary in size and may be located at various levels of the hierarchy of cells. In this regard, the controller 101 may identify one or more repeating blocks (e.g., cells or polygons) in the received design data with a known or observed design cell hierarchy. For example, a design cell hierarchy may be analyzed to identify repeating groups within a given set of inspection data. The identified repeating cells may then undergo inspection. In another embodiment, the controller 101 may determine, or construct, a design hierarchy for inspection utilizing the recognition of repeating blocks through various hierarchical levels of the design data.

In another embodiment, the repeating blocks structures may be identified utilizing a design rule checking (DRC) process, an optical rule checking (ORC) process, or a failure analysis (FA) process in order to identify patterns critical to device performance. In another embodiment, the repeating blocks may be identified utilizing a process window qualification method (PWQ). Searching design data for one or more repeating blocks may be performed as described in the above-described references by Kulkarni et al. and Zafar et al., which are incorporated above by reference.

In some embodiments, the repeating blocks (or fields) may be identified on the semiconductor wafer utilizing data from electronic design automation (EDA) tools and other knowledge. Any such information about the design generated by an EDA tool may be used to identify the repeating blocks. In addition, the design data may be searched for one or more repeating blocks in any suitable manner. For example, searching the design data for one or more repeating blocks may be performed as described in the above-referenced patent applications by Kulkarni et al. and Zafar et al., which are incorporated above by reference. In addition, the repeating blocks may be selected or identified using any other method or system described in this patent application.

Further, each design may be analyzed in order to identify appropriate blocks for inspection based on the given inspection technology (e.g., optical inspection, e-beam inspection and the like).

Figure 7B:
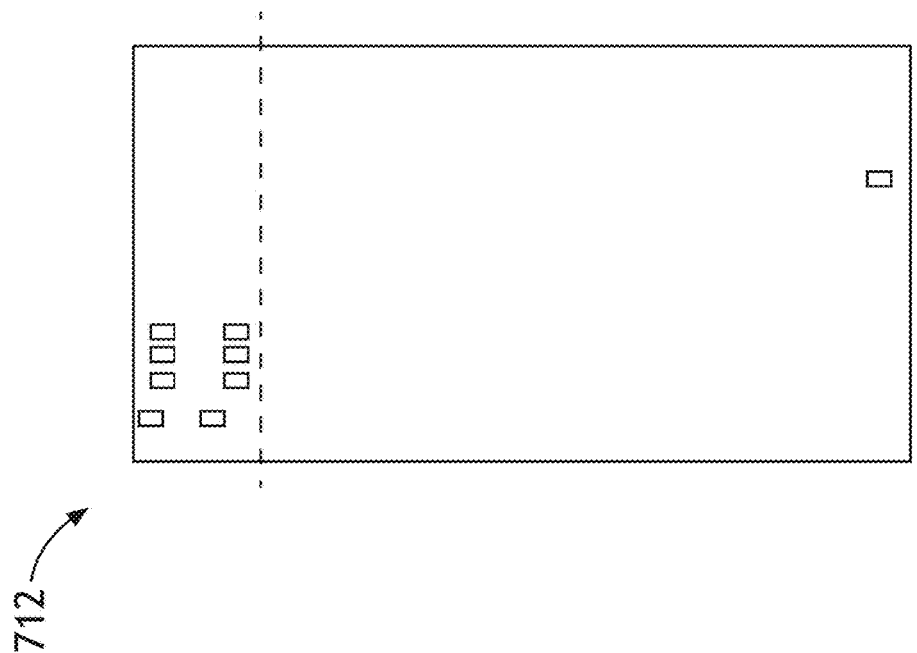
Figure 7B:
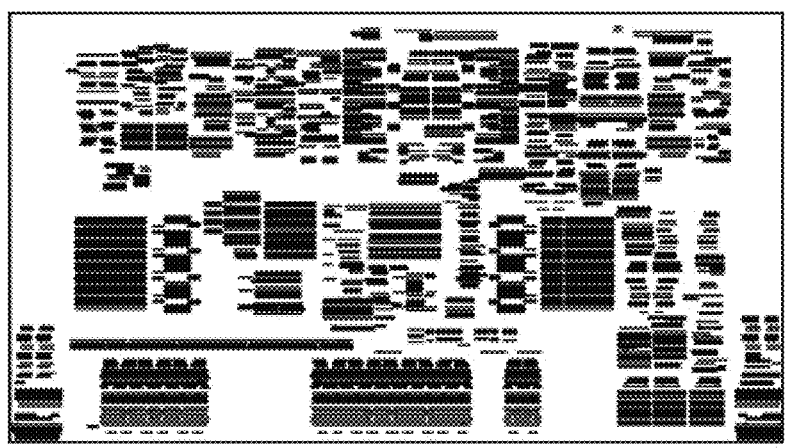
Figure 7D:
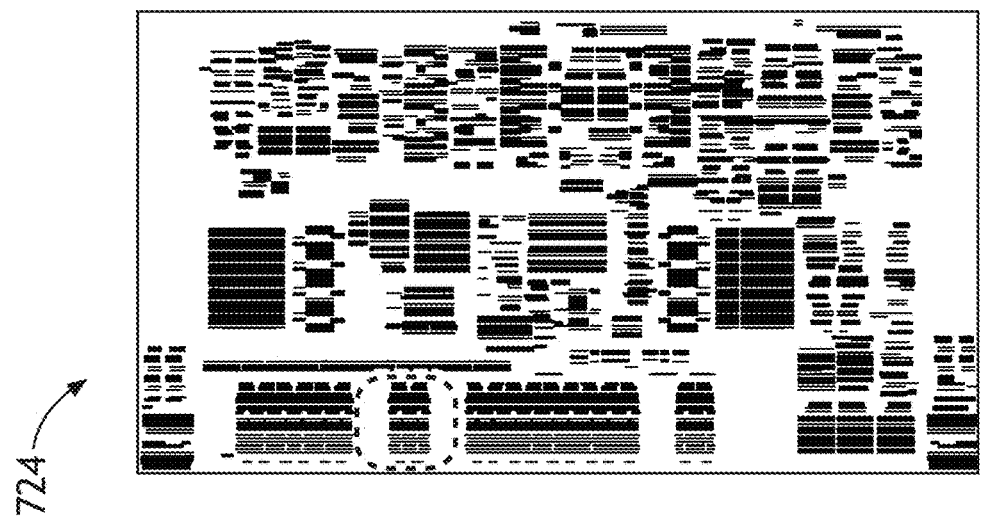
FIG. 7D illustrates a series of top views of multiple inspected wafer regions with an identified DCA, in accordance with one embodiment of the present invention.
Figure 7D:
Figure 7D:
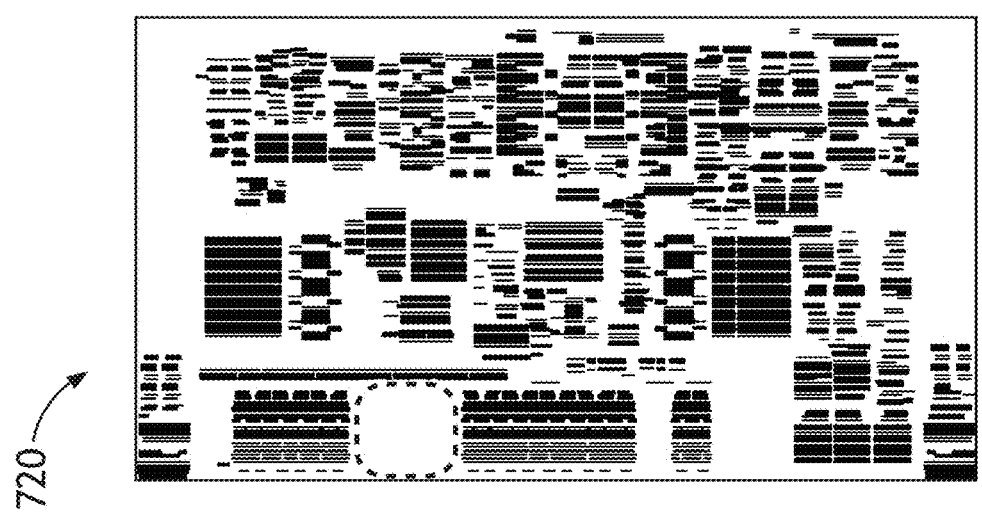

It is recognized that repeating cells (or polygons) may be repeated through the die of a wafer, forming repeating blocks (or fields). In addition, cells are sometimes repeated through a given die under different names or may be repeated under one name at multiple locations. In some embodiments, repeating cells are aligned on the same horizontal and/or vertical axis. In other embodiments, repeating cells are not aligned on the same horizontal and/or vertical axis. FIG. 7B depicts an example of repeating cells not aligned along the horizontal axis, as shown in images 710 and 712. In some embodiments, repeating cells are periodically spaced along one or more axes. In other embodiments, repeating cells are not periodically spaced along one or more axes.

FIG. 7C illustrates a series of blocks 714-718 displaying the flipping of a second set of cells relative to a first set of cells, in accordance with one embodiment of the present invention. In one embodiment, utilizing the received design data the controller 101 may identify a first repeating block (e.g., see block 716). Then, based on the received design data, the controller 101 may identify at least a second repeating block (e.g., see block 714) flipped relative to the first repeating block utilizing the received design data. In this regard, the controller 101 may compare corresponding portions of the first repeating block structure to the second repeating block flipped relative to the first repeating block structure in order to identify one or more defects the first block or the second block. In this sense, controller 101 may effectively apply a transformation to the image of the second block that acts to "flip" the image about one axis, such that it substantially matches the pattern of the first repeating block. For example, block 718 represents a flip version of box 714. Then, the flipped block may be used for the purposes of inspection.

Similarly, controller 101 may identify a first repeating block and, then, identify at least a second repeating block rotated relative to the first repeating utilizing the received design data. In turn, controller 101 may apply a transformation that acts to "rotate" the image for purposes of comparison to other repeating blocks for inspection. It is further recognized that the notion of flipping and rotation may be used in conjunction with one another to both flip and rotate a given image prior to comparison.

In another embodiment, the one or more repeating blocks may be identified by controller 101 via image processing. For example, the controller 101 may apply an image processing algorithm to a received design layout file to identify one or more repeating blocks within the design data of the design layout file. These identified repeating blocks may then be used by the controller 101 to direct inspection of the repeating blocks.

In another embodiment, one or more images of one or more non-spatially repeating and non-aligned portions of the region of interest may be processed and stored. Then, these regions may be compared to other regions of interest in order to identify one or more repeating blocks for inspection. These identified repeating blocks may then be used by the controller 101 to direct inspection of the repeating blocks.

In another embodiment, the one or more selected attributes used to select a portion of the identified one or more repeating blocks for inspection may include, but are not limited to, the pattern density of the analyzed repeating blocks of cells or polygons or the criticality of the area of the analyzed repeating blocks of cells.

It is recognized herein that any method known in the art for analyzing the pattern density or the criticality of a given area should be interpreted as applicable to the present invention.

In one embodiment, the controller 101 may generate a design based classification (DBC) database. The database may include a criticality factor or 'weight' associated with each repeating block of cells (or polygons). In some embodiments, the weight of the criticality associated with each of the repeating blocks or components of the blocks (e.g., cells or polygons) is determined utilizing test data, such as, but not limited to, data associated with logic/memory portions of the wafer, functional tests, failure analysis (FA) and the like. It is noted herein that the criticality factor associated with the patterns along with the frequency of occurrence of the patterns in the given device may be used to determine a relative risk level of failure for a given die or an entire device.

For example, measurement of criticality and the use of a "criticality factor" and a DBC database to analyze the significance of a given area of inspection is described in U.S. patent application Ser. No. 13/399,805 to Park, filed on Feb. 17, 2012, which is incorporated above in the entirety.

In another embodiment, each cell may be evaluated for inspectability based on a selected a feasibility metric. For example, the feasibility metric may consist of a figure of merit indicative of the feasibility of inspection of one or more cells. For instance, the feasibility metric may be a function of any number of physical parameters, such as, but not limited, the orientation of one or more cells, the size of one or more cells and/or the components of one or more cells.

In another embodiment, prior to identifying one or more repeating blocks (described above), at least one "Don't Care Area" (DCA) is generated using the received design data. For example, the received design data may contain information allowing the controller 101 to identify regions that are not critical for processing and/or device purposes. For instance, the design data may be analyzed by controller 101 in order to identify one or more localized element variations, leading to a region suitable for a DCA designation, as shown by the dotted boxes in FIG. 7D. In this regard, a generated DCA may be applied to a selected region and effectively ignored for analysis purposes. It is noted herein that such an approach aids in comparing non-conforming repeating blocks. In this regard, the DCA region 720, 722 and 724 associated with three different non-conforming repeating blocks may be ignored, thereby allowing the remaining portions of these blocks to be compared for defect detection. The use of one or more DCAs is described in U.S. patent application Ser. No. 11/939,983 to Marella, filed on Nov. 14, 2007, which is incorporated herein by reference in the entirety.

Figure 7E:
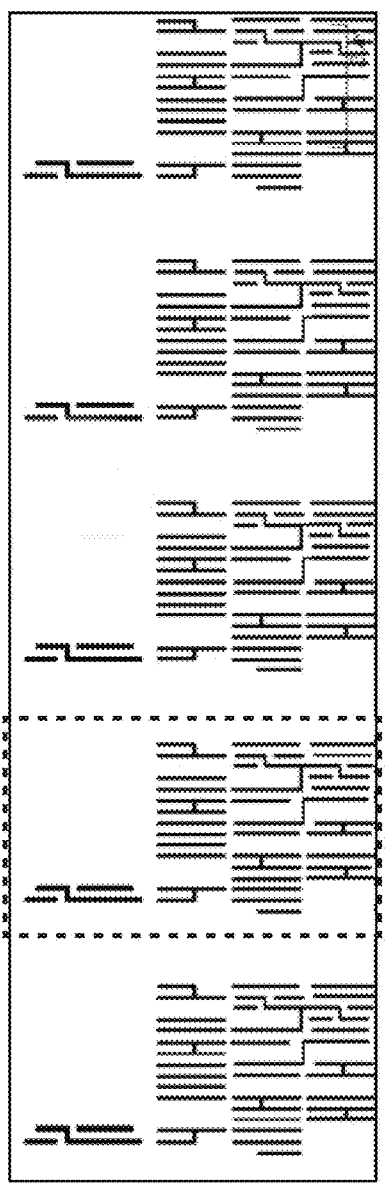
FIGS. 7E and 7F illustrates a pair of parent cells including identical lower level cells, in accordance with one embodiment of the present invention.
Figure 7F:
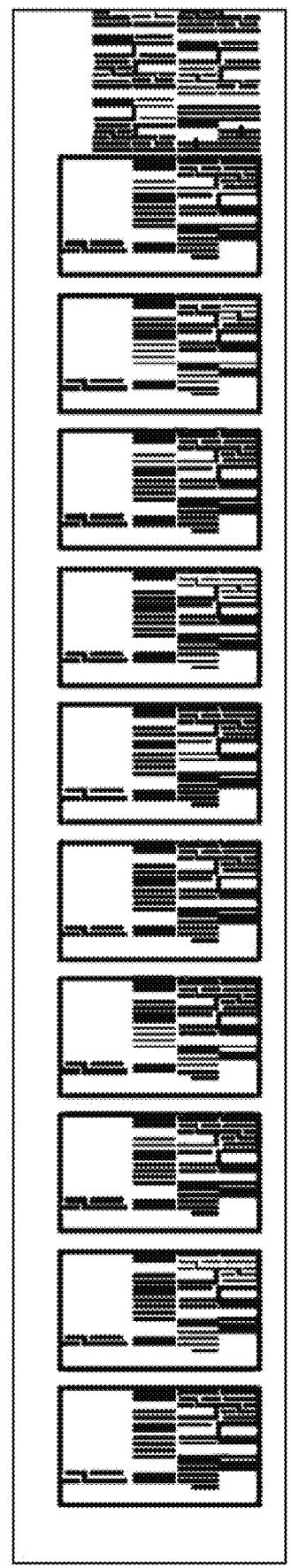

It is further noted that the interplay between a lower level cell and its parent cell may be utilized by method 700 to identify repeating blocks. In this regard, the controller 101 may analyze parent cells and the component lower level cells to identify repeating blocks of cells. For instance, as shown in FIGS. 7E and 7F, a lower level cell may be represented five times in a first parent 726, while being represent ten times in a second parent 728.

In one embodiment, the inspection tool used in method 700 (or any method disclosed in this disclosure) may include any inspection tool known in the art. For example, the inspection tool may include, but is not limited to, an optical inspection tool, such as a BF inspection tool or a DF inspection tool. By way of another example, the inspection tool may include, but is not limited to, an electron beam inspection tool.

It is further noted herein that the various embodiments and examples of description of the mixed-mode inspection and field-to-field inspection described previously herein should be interpreted to apply to method 700. For example, the mixed mode inspection process (e.g., method 200, 300, 400 and 500) may be utilized to inspect regions of repeating blocks (or fields) as identified in method 700. By way of another example, the reference field generation process of the field-to-field analysis (e.g., method 600 and 610) may be used in conjunction with the design data based analysis of method 700 to inspect one or more regions of repeating blocks.

Although embodiments are described herein with respect to wafers, it is to be understood that the embodiments may be used for improved defect detection on a reticle, also referred to herein as a mask or a photo mask. Many different types of reticles are known in the art, and the terms "reticle," "mask," and "photo mask" as used herein are intended to encompass all types of reticles known in the art.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and application programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:

1. A method for providing field-to-field based wafer inspection comprising:
   receiving one or more inspection results of a wafer, wherein the one or more inspection results include one or more images of a selected region of the wafer, the one or more images including three or more fields, each of the three or more fields included in a common die, each of the three or more fields including one or more repeating structures within the common die;
   generating a reference field image by combining the three or more fields of the inspection results, each of the three or more fields included in the common die, wherein a noise floor of the reference field is lower than a noise floor of any of the three or more fields; and
   comparing one or more fields to the generated reference field image in order to identify an occurrence of one or more defects in the one or more fields.

2. The method of claim 1, wherein the combining the three or more fields of the inspection results comprises:
   combining the three or more fields of the inspection results with one or more ensemble-based pixel processing procedures.

3. The method of claim 2, wherein the ensemble-based pixel processing procedures comprises:
   at least one of median processing, arithmetic averaging, geometric averaging, weighted averaging and unbiased best linear estimation.

4. The method of claim 1, wherein the compared one or more fields are acquired from the received one or more inspection results.

5. The method of claim 1, wherein the compared one or more fields are acquired from an additional one or more inspection results.

6. The method of claim 1, wherein the comparing one or more fields to the generated reference field in order to identify an occurrence of one or more defects in the one or more fields comprises:
 calculating a difference between a set of pixel values of the one or more fields and a corresponding set of pixel values of the generated reference field image.

7. The method of claim 1, wherein at least one of the three or more fields of the generated reference field image and the one or more fields compared to the generated reference field image include a repeating set of cells.

8. The method of claim 1, wherein at least one of the three or more fields of the generated reference field image and the one or more fields compared to the generated reference field image comprise:
 two or more fields having a regular spacing along at least one of a first direction and a second direction perpendicular to the first direction.

9. The method of claim 1, wherein at least one of the three or more fields of the generated reference field image and the one or more fields compared to the generated reference field image comprise:
 two or more fields having an irregular spacing along at least one of a first direction and a second direction perpendicular to the first direction.

\* \* \* \* \*